United States Patent
Tsukada

(10) Patent No.: US 8,164,613 B2
(45) Date of Patent: Apr. 24, 2012

(54) VIDEO COMMUNICATION SYSTEM, TERMINAL, AND IMAGE CONVERTER

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 1145 days.

(21) Appl. No.: 11/920,155

(22) PCT Filed: Apr. 17, 2006

(86) PCT No.: PCT/JP2006/308017
§ 371 (c)(1),
(2), (4) Date: Nov. 9, 2007

(87) PCT Pub. No.: WO2006/120840
PCT Pub. Date: Nov. 16, 2006

(65) Prior Publication Data
US 2009/0122130 A1    May 14, 2009

(30) Foreign Application Priority Data

May 12, 2005  (JP) ................ 2005-140259

(51) Int. Cl.
*H04N 7/14* (2006.01)
*H04N 7/01* (2006.01)

(52) U.S. Cl. .................... 348/14.02; 348/448

(58) Field of Classification Search ............... 348/14.01, 348/14.02, 14.03, 65, 448, 452, 472, 717, 348/E7.083; 345/22, 550
See application file for complete search history.

(56) References Cited

U.S. PATENT DOCUMENTS

| | | | | |
|---|---|---|---|---|
| 4,719,503 A | * | 1/1988 | Craver et al. | 348/472 |
| 6,535,632 B1 | * | 3/2003 | Park et al. | 382/164 |
| 7,202,886 B2 | | 4/2007 | Matsuo et al. | |
| 7,483,082 B2 | * | 1/2009 | Chou | 348/448 |
| 2004/0160519 A1 | | 8/2004 | Horita | |

FOREIGN PATENT DOCUMENTS

| | | |
|---|---|---|
| JP | 7-65160 A | 3/1995 |
| JP | 08-223570 | 8/1996 |
| JP | 08-289274 | 11/1996 |
| JP | 2003-016475 A | 1/2003 |
| JP | 2003-258956 A | 9/2003 |
| JP | 2004-104431 A | 4/2004 |

(Continued)

OTHER PUBLICATIONS

Translation for IPEA 409 for JP 2006-308107. Report completed Aug. 21, 2007. Translation completed Dec. 2011.*

(Continued)

*Primary Examiner* — Brian Ensey
(74) *Attorney, Agent, or Firm* — Foley & Lardner LLP

(57) ABSTRACT

Image input device (57) of a mobile phone captures an image of the face of the speaker and stores the captured image data in image memory (53). Communication image generator (52) reads the image data stored in image memory (53) and converts the image data into illustration image data representing an illustration-like image of the speaker. Communication image generator (52) stores the illustration image data in image memory (53). Central controller (51) reads the illustration image data from image memory (53), and sends the illustration image data via wireless device (54) and antenna (59). A mobile phone of the party who the speaker is talking to receives the illustration image data, and displays an illustration-like image of the speaker based on the image data.

14 Claims, 11 Drawing Sheets

FOREIGN PATENT DOCUMENTS

| | | |
|---|---|---|
| JP | 2004-246644 A | 9/2004 |
| JP | 2004-289254 A | 10/2004 |

OTHER PUBLICATIONS

"What 900i-series 'Chara-den' can do", [online], Jan. 23, 2004, IT Media Kabushiki Kaisha [browsed Apr. 19, 2005] internet <URL:http://www.itmedia.co.jp/mobile/articles/0401/23/news028.html>.

A.R. Smith, "Color Gamut Transform Pairs," Computer Graphics, vol. 12, pp. 12-19, 1978.

M. Takagi et al., "Image analysis handbook, new edition," University of Tokyo Press, Sep. 10, 2004, pp. 552-555.

* cited by examiner

| f (-2,-2) = -1 | f (-1,-2) = -2 | f (0,-2) = -3 | f (1,-2) = -2 | f (2,-2) = -1 | X mag |
|---|---|---|---|---|---|
| f (-2,-1) = -2 | f (-1,-1) = 0 | f (0,-1) = 5 | f (1,-1) = 0 | f (2,-1) = -2 | |
| f (-2, 0) = -3 | f (-1,0) = 5 | f (0,0) = 13 | f (1,0) = 5 | f (2, 0) = -3 | |
| f (-2,1) = -2 | f (-1,1) = 0 | f (0,1) = 5 | f (1,1) = 0 | f (2,1) = -2 | |
| f (-2, 2) = -1 | f (-1,2) = -2 | f (0,2) = -3 | f (1,2) = -2 | f (2, 2) = -1 | |

|  | sending terminal to server | server to receiving terminal | total |
|---|---|---|---|
| illustration image | 3 yen | 3 yen | 6 yen |
| captured image | 5 yen | 5 yen | 10 yen |

|  | communication fee to be billed to sender | communication fee to be billed to receiver |
|---|---|---|
| mode 1 | 6 yen | 4 yen |
| mode 2 | 0 yen | 10 yen |
| mode 3 | 10 yen to be paid | 20 yen |

Fig. 18(a)

| | sending terminal to server | server to receiving terminal | total |
|---|---|---|---|
| when conversion is performed | 5 yen | 3 yen | 8 yen |
| when conversion is not performed | 5 yen | 5 yen | 10 yen |

| | communication fee to be billed to sender | communication fee to be billed to receiver |
|---|---|---|
| mode 1 | 8 yen | 2 yen |
| mode 2 | 0 yen | 10 yen |
| mode 3 | 10 yen to be paid | 20 yen |

Fig. 18(b)

VIDEO COMMUNICATION SYSTEM, TERMINAL, AND IMAGE CONVERTER

This application is the National Phase of PCT/JP2006/308017, filed Aug. 28, 2006, which claims priority to Japanese Application No. 2005-140259, filed May 12, 2005, the disclosures of which are hereby incorporated by reference in their entirety.

TECHNICAL FIELD

The present invention relates to a video communication system for sending and receiving image data of an object to be imaged between terminals such as videophones or the like, and a terminal and an image converter for use in a video communication system.

BACKGROUND ART

Videophone services have been growing popular. According to a mode of videophone services, animation characters and avatars are displayed on the videophone of a party who the speaker is talking to. An example of animation character that can be displayed on the videophone which is a mobile phone is shown in Non-patent Document 1.

Patent Document 1 also discloses a videophone for generating a virtual character based on the face of the speaker imaged by a camera and sending image data of the virtual character to a party who the speaker is talking to. According to the technology of Patent Document 1, the videophone recognizes which area represents a face from the face image captured by the camera, and extracts feature points including eyebrows, eyes, a nose, and a mouse from the face image to generate a virtual character.

An RGB format is known in the art for expressing image data. Known color spaces include an HSV color space, a uniform LCH color space, etc. Conversion between the RGB format and the HSV color space is disclosed in Non-patent Document 2, for example.

Non-patent Document 3 reveals conversion between the L*a*b* color model and the L*C*abhab color model, and conversion between the L*u*v* color model and the L*C*uvhuv color model. C*ab and C*uv correspond to the element "C" in the uniform LCH color space, and hab and huv to the element "H" in the uniform LCH color space.

The communication mode for displaying animation characters and avatars the videophone of a party who the speaker is talking to is problematic in that it is difficult for the party to identify the speaker.

Another problem is that the communication mode may adversely affect the communication depending on the party who the speaker is talking to. For example, if the party who the speaker is talking to is a speaker's superior such as a supervisor or the like, then the speaker's superior may judge the speaker as frivolous when an animation character or an avatar is displayed on the videophone of the speaker's superior.

In addition, the communication mode is also disadvantageous in that animation characters and avatars make it difficult to convey delicate facial expressions of the speaker and environmental information about the location of the speaker.

It is preferable to improve the above drawbacks for better communications.

According to the technology disclosed in Patent Document 1, the processing load is high because there is a need for a process for recognizing which area represents the face and extracting feature points. For conveying changes in the facial expression of the speaker in real time, a high-performance CPU is required and hence a cost increase incurred.

Patent Document 1: JP-A No. 2004-289254 (paragraphs 0017-0025)

Non-patent Document 1: "What 900i-series "Chara-den" can do", [online], Jan. 23, 2004, IT Media Kabushiki Kaisha, [browsed Apr. 19, 2005], Internet <URL: http://www.itmedia.co.jp/mobile/articles/0401/23/news028.html>

Non-patent Document 2: Alvy Ray Smith, "COLOR GAMUT TRANSFORM PAIRS", Computer Graphics, Vol. 12, pp. 12-19, 1978

Non-patent Document 3: Mikio Takagi, Akihisa Shimoda, "Image analysis handbook, new edition", University of Tokyo Press, Sep. 10, 2004, p. 552-555

DISCLOSURE OF THE INVENTION

It is an object of the present invention to provide a video communication system, a terminal, and an image converter for allowing the speaker at a terminal such as a videophone or the like to perform better communications with a party who the speaker is talking to.

Another object of the present invention is to provide a video communication system, a terminal, and an image converter for reducing a processing burden for conveying delicate facial expressions of the speaker and environmental information about the location of the speaker.

A video communication system according to a first aspect of the present invention comprises a first terminal for sending image data of an object to be imaged and a second terminal for receiving the image data sent from the first terminal, the first terminal comprising:

image data converting means for converting the image data of the object to be imaged into image data representing a picture-like image of the object to be imaged, using at least image feature quantities contained in the object to be imaged; and the second terminal comprising:

image display means for displaying an image based on the image data converted by the image data converting means.

With the above video communication system, the image data converting means of the first terminal converts the image data of the object to be imaged into image data representing a picture-like image of the object to be imaged, using at least image feature quantities contained in the object to be imaged, and the image display means of the second terminal displays an image based on the image data converted by the image data converting means.

Therefore, the picture-like image of the object to be imaged can be displayed on the second terminal. As a result, the speaker using the first terminal can be identified by the speaker using the second terminal. Even if the speaker using the second terminal is a first terminal speaker's superior, the picture-like image does not give an impression that the speaker using the first terminal is frivolous, and hence good communications can be realized.

The first terminal may further comprise:

image data generating means for capturing an image of the object to be imaged and generating the image data of the object to be imaged; and the image data converting means may convert the image data generated by the image data generating means.

The second terminal may further comprise:

changing request sending means for sending a changing request for changing the image data to the first terminal in response to an action of a speaker using the second terminal; and the first terminal may further comprise:

data-to-be-sent changing means, responsive to the changing request, for controlling the degree of the conversion by the image data converting means based on the changing request or stopping the conversion by the image data converting means, and sending the image data converted by the image data converting means or the image data generated by the image data generating means to the second terminal.

The video communication system may further comprise:

a fee management server for calculating communication fees filled to speakers using the first and second terminals, respectively, and receiving the changing request sent from the second terminal to the first terminal;

the fee management server comprising:

communication fee calculating means for calculating communication fees to be billed to the speakers using the first and second terminals after the changing request is received.

The image data converting means may convert the image data into the image data representing the picture-like image of the object to be imaged by reducing the number of colors of the image data of the object to be imaged.

The image data converting means may convert the image data of the object to be imaged per pixel.

With the above arrangement, since the image data are converted per pixel, there is no need for a process for recognizing a particular area and the processing burden is reduced.

A video communication system according to a second aspect of the present invention comprises a first terminal for sending image data of an object to be imaged, an image converter for receiving the image data sent from the first terminal and converting the image data, and a second terminal for receiving the image data converted by the image converter, the image converter comprising:

image data converting means for converting the image data of the object to be imaged into image data representing a picture-like image of the object to be imaged, using at least image feature quantities contained in the object to be imaged; and the second terminal comprising:

image display means for displaying an image based on the image data converted by the image data converting means.

BRIEF DESCRIPTION OF THE DRAWINGS

FIGS. 18(a) and 18(b) are diagrams showing examples of communication fees in the video communication system according to modification 1 of the third exemplary embodiment of the present invention.

BEST MODE FOR CARRYING OUT THE INVENTION

The best mode for carrying out the invention will be described below with reference to the drawings. In the description which follows, mobile terminals will be described as terminals. Though there are various types of mobile terminals, mobile phones will be described as mobile terminals below.

1st Exemplary Embodiment

Figure 1:
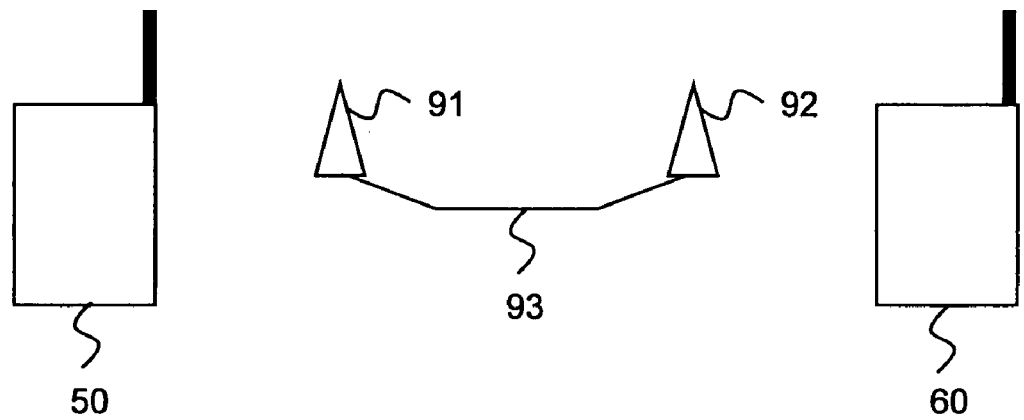
FIG. 1 is a diagram showing an arrangement of a video communication system according to a first exemplary embodiment of the present invention.

FIG. 1 is a diagram showing an arrangement of a video communication system according to a first exemplary embodiment of the present invention.

As shown in FIG. 1, the video communication system according to the first exemplary embodiment of the present invention comprises mobile phones 50, 60 and base stations 91, 92.

Mobile phones 50, 60 are capable of communicating with each other while sending and receiving image data representative of an illustration (picture)-like image of objects to be imaged such as speakers or the like.

For illustrative purposes, mobile phone 50 sends image data, and mobile phone 60 receives and displays the image data. Mobile phone 60 may be a mobile phone capable of displaying image data received from mobile phone 50 during communications.

The term "illustration (picture)-like image" refers to an image whose image qualities have changed while retaining features of the captured image. For example, an illustration (picture)-like image may represent an image whose number of colors is reduced while retaining the edge components of the image.

Mobile phone 50 sends a wireless signal to and receives a wireless signal from base station 91, and mobile phone 60 sends a wireless signal to and receives a wireless signal from base station 92. Base stations 91, 92 send and receive signals via network 93. Therefore, mobile phones 50, 60 send and receive signals (speech data and image data) through base station 91, network 93, and base station 92.

Figure 2:
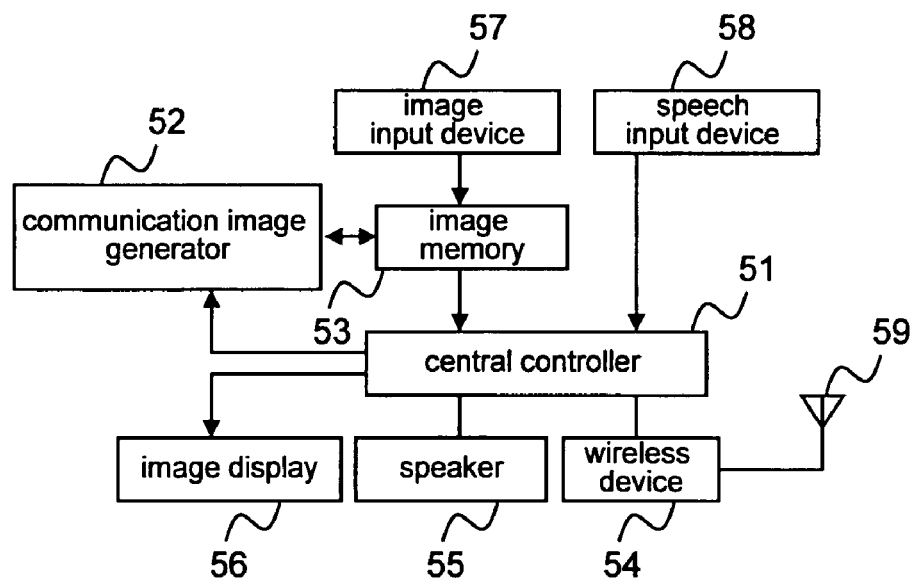
FIG. 2 is a block diagram of an arrangement of a mobile phone according to the first exemplary embodiment of the present invention for generating image data representative of an illustration of the speaker and sending the image data to another mobile phone.

FIG. 2 is a diagram showing an arrangement of mobile phone 50 for generating image data representative of an illustration-like image of the speaker and sending the image data to other mobile phone 50, of mobile phones 50, 60 according to the first exemplary embodiment of the present invention.

As shown in FIG. 2, mobile phone 50 comprises central controller 51, communication image generator 52, image memory 53, wireless device 54, speaker 55, image display 56, image input device 57, speech input device 58, and antenna 59.

Central controller 51 controls mobile pone 50 in its entirety. Central controller 51 is implemented by a CPU which operates according to a program, for example. The program may be stored in advance in a memory device (not shown) such as a ROM or the like.

Image input device 57 is implemented by a camera, for example, captures an image of the face of the speaker using mobile phone 50, and stores the captured image data in image memory 53. Image input device 57 may capture a moving image of the speaker or may capture a still image of the speaker. In the description which follows, it is assumed that image input device 57 captures a moving image of the speaker and stores the image data of the moving image in image memory 53.

Communication image generator 52 reads the captured image data from image memory 53 and converts the image data into image data representing an illustration-like image. Communication image generator 52 stores the converted image data in image memory 53. The image data to be converted by communication image generator 52 will hereinafter be referred to as captured image data, and the converted image data as illustration image data. Communication image generator 52 processes the entire captured image data to reduce the number of colors of the image represented by the captured image data, and converts the processed image data into illustration image data.

Image memory 53 stores the captured image data and the illustration image data.

Image display 56 displays image data under the control of central controller 51. For example, image display 56 displays an image based on the illustration image data sent to other mobile phone 60. As a result, image display 56 indicates to the speaker the image that is displayed on mobile phone 60 of the party to which the speaker is talking to.

Speech input device 58 comprises a microphone, for example, for inputting the speech of the speaker.

Wireless device 54 sends illustration image data and speech data to other mobile phone 60 (specifically, base station 91) through antenna 59 under the control of central controller 51. Wireless device 54 also receives speech data, etc. from other mobile phone 60 through antenna 59.

Speaker 55 outputs the speech of the party to which the speaker is talking to (the speaker using mobile phone 60) based on the speech data from other mobile phone 60.

Figure 3:
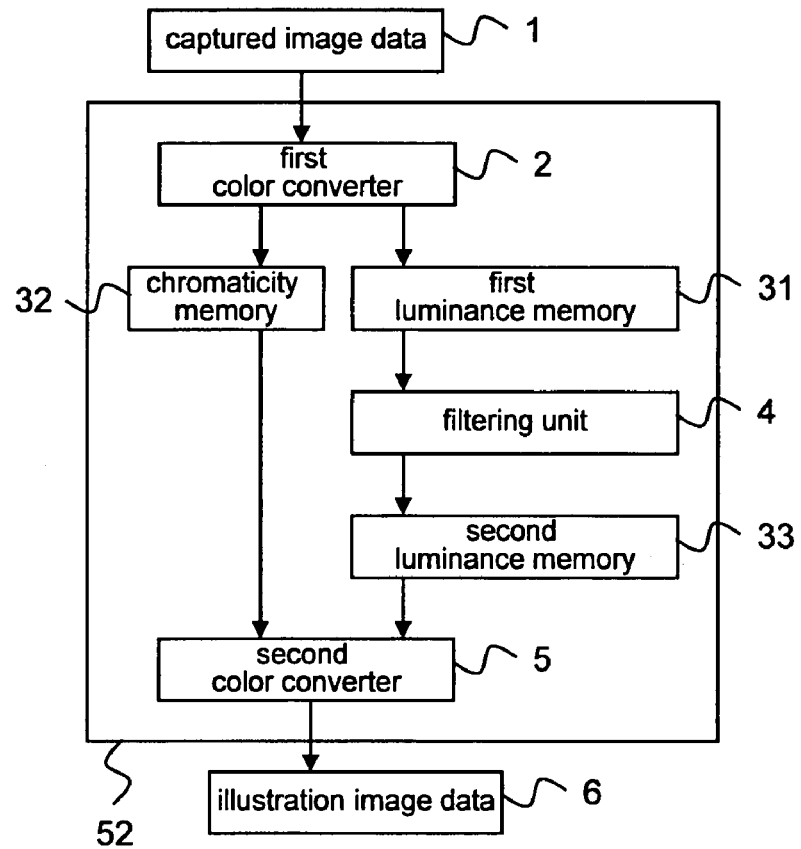
FIG. 3 is a block diagram of an arrangement of a communication image generator according to the first exemplary embodiment of the present invention.

FIG. 3 is a block diagram of an arrangement of communication image generator 52 according to the first exemplary embodiment of the present invention.

As shown in FIG. 3, communication image generator 52 comprises first color converter 2, chromaticity memory 32, first luminance memory 31, filtering unit 4, second luminance memory 33, and second color converter 5.

First color converter 2, filtering unit 4, and second color converter 5 may be implemented by the CPU incorporated in mobile phone 50 and operable according to the program. Alternatively, first color converter 2, filtering unit 4, and second color converter 5 may each be implemented by a dedicated LSI circuit separate from the CPU. For lowering the production cost of mobile phone 50, however, first color converter 2, filtering unit 4, and second color converter 5 should preferably be implemented by the CPU operable according to the program.

Captured image data 1 are image data of a color image captured by image input device 57 (see FIG. 2). It is assumed that captured image data 1 are image data expressed according to the RGB format using the three primaries of R, G, B. It is also assumed that each pixel of captured image data 1 is represented by an 8-bit value for each of R (red), G (green), and B (blue). Therefore, each of R, G, B of each pixel has a value in the range from 0 to 255.

Illustration image data 6 are image data produced by communication image generator 52 when communication image generator 52 has processed captured image data 1, and represent a picture image. As with captured image data 1, it is assumed that illustration image data 6 are image data expressed according to the RGB format for expressing each pixel with R, G, B.

First color converter 2 reads captured image data 1 from image memory 53 (see FIG. 2). First color converter 2 then converts components of captured image data 1 (components representing captured image data, i.e., R, G, B components in the present embodiment) into a luminance component and a chromaticity component for each pixel. At this time, first color converter 2 converts the components of captured image data 1 into a luminance component and a chromaticity component in a color space wherein the chromaticity (saturation and hue) does not change even if the luminance changes or a color space wherein the chromaticity changes little even if the luminance changes. As a result, first color converter 2 separates captured image data 1 into a luminance component and a chromaticity component. The color space wherein the chromaticity changes little even if the luminance changes means "a color space wherein the range of chromaticity does not become nil (does not converge to one point) when the luminance is of a maximum value which the luminance can take". In a YCrCb color space, when the luminance is of a maximum value which the luminance can take, the range of chromaticity converges to one point, and can express only white. Therefore, the YCrCb color space does not correspond to "the color space wherein the chromaticity changes little even if the luminance changes". Similarly, the L*a*b* color space and the L*u*v* color space do not correspond to "the color space wherein the chromaticity changes little even if the luminance changes".

It is also assumed that first color converter 2 converts each pixel of captured image data 1 expressed according to the RGB format of the three primaries into a luminance component and a chromaticity component in the HSV color space. The HSV color space is a color space wherein the chromaticity does not change even if the luminance changes. Chromaticity components in the HSV color space include hue and saturation. Hue, saturation, and luminance in the HSV color space are represented by H, S, V, respectively. First color converter 2 expresses hut H, saturation S, and luminance V of each pixel that are produced by the conversion, respectively with an 8-bit value (a value ranging from 0 to 255). Image data comprising data of luminance component V will hereinafter be referred to as a luminance image, and image data comprising data of chromaticity component (hue H and saturation S) as a chromaticity image.

First color converter 2 stores a chromaticity image obtained by the converting process in chromaticity memory 32, and stores a luminance image in first luminance memory 31.

Chromaticity memory 32 stores the chromaticity image obtained by the converting process performed by first color converter 2.

First luminance memory 31 stores the luminance image obtained by the converting process performed by first color converter 2.

Filtering unit 4 performs a spatial filtering process on the luminance image (i.e., data of luminance V) stored in first luminance memory 31. Data derived as a result of the spatial filtering process are represented by V'. The filtering process performed by filtering unit 4 will be described later. Filtering unit 4 stores data V' derived according to the filtering process in second luminance memory 33.

Second luminance memory 33 stores data V' derived by filtering unit 4.

Second color converter 5 performs a converting process which is an inversion of the converting process performed by first color converter 2, using data V' stored in second luminance memory 33 as a luminance component and the chromaticity image (i.e., data of hue H and saturation S) stored in chromaticity memory 32. Specifically, second color converter 5 converts the image data represented by the luminance component and the chromaticity component in the HSV color space into image data according to the RGB format represented by R, G, B. Second color converter 5 stores the image data obtained by the inverse converting process as illustration image data 6 in image memory 53 (see FIG. 2).

As with mobile phone 50, mobile phone 60 comprises central controller 51, wireless device 54, speaker 55, image display 56, speech input device 58, and antenna 59. Central controller 51 of mobile phone 60 receives image data and speech data via wireless device 54 and antenna 59. Central controller 51 of mobile phone 60 also sends a signal representing speech data, etc. via wireless device 54 and antenna 59. Central controller 51 of mobile phone 60 displays an image based on the received image data on image display 56.

Operation of the video communication system according to the first exemplary embodiment will be described below.

Figure 4:
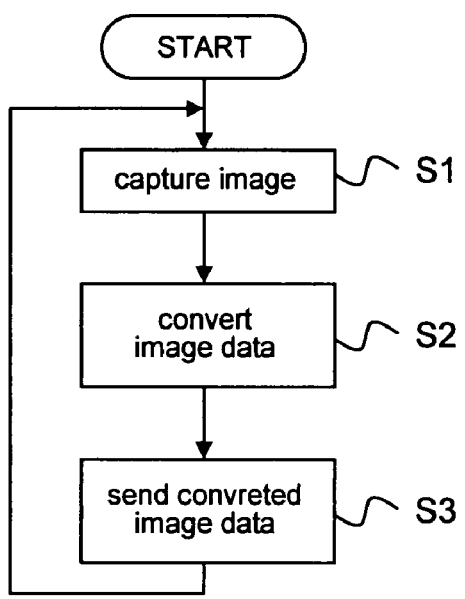
FIG. 4 is a flowchart of an operation sequence of the mobile phone according to the first exemplary embodiment of the present invention for generating and sending image data to the other mobile phone.

FIG. 4 is a flowchart of an operation sequence of mobile phone 50 for generating and sending illustration image data to mobile phone 60, of mobile phones 50, 60 according to the first exemplary embodiment of the present invention.

As shown in FIG. 4, at the start of a communication session, central controller 51 of mobile phone 50 controls image input device 57 to capture a moving image of the face of the speaker, for example, and stores the captured image data of the moving image in image memory 53 (step S1). Under the control of central controller 51, image input device 57 captures a moving image of the face of the speaker and stores the captured image data of the moving image in image memory 53.

Then, communication image generator 52 reads the captured image data from image memory 53, converts the captured image data into illustration image data, and stores the illustration image data in image memory 53 (step S2).

Central controller 51 reads the illustration image data from image memory 53 and controls wireless device 54 to send the illustration image data (step S3). At this time, central controller 51 controls wireless device 54 to send the illustration image data together with speech data of speech input to speech input device 58. Under the control of central controller 51, wireless device 54 sends the illustration image data and the speech data to other mobile phone 60.

Mobile phone 50 repeats the processing of steps S1 through S3 until the communication session is over. While repeating the processing of steps S1 through S3, central controller 51 controls image display 56 to display an image based on the illustration image data that are sent. Central controller 51 thus indicates to the speaker an image that is displayed on the mobile phone of the party who the speaker is talking to. While repeating the processing of steps S1 through S3, central controller 51 may control image display 5 to display a GUI for prompting the speaker to start and end the display of the image based on the illustration image data that are sent. When the speaker enters an instruction to start the display of the image through the GUI, central controller 51 starts displaying the image based on the illustration image data that are sent. When the speaker enters an instruction to end the display of the image through the GUI, central controller 51 ends the display of the image.

Other mobile phone 60 receives the illustration image data and the speech data from mobile phone 50. Based on the received illustration image data, mobile phone 60 displays the moving image of the speaker using mobile phone 50 and outputs the speech of the speaker through the speaker.

In the above description, image input device 57 of mobile phone 50 captures the moving image of the face of the speaker, for example, under the control of central controller 51. However, image input device 57 may capture a still image of the face of the speaker and store the captured image data of the still image in image memory 53 under the control of central controller 51. In this case, communication image generator 52 generates image data of the still image as illustration image data, and central controller 51 controls wireless device 54 to send the illustration image data. Having received the illustration image data, mobile phone 60 displays the still image of the speaker using mobile phone 50 based on the illustration image data.

Operation of communication image generator 52 in step S2 shown in FIG. 4 will be described below.

When first color converter 2 reads captured image data 1 expressed according to the RGB format from image memory 53 (see FIG. 2), first color converter 2 converts the components (R, G, B) of captured image data 1 into a luminance component and a chromaticity component in the HSV color space for each pixel.

Figures 5, 6:
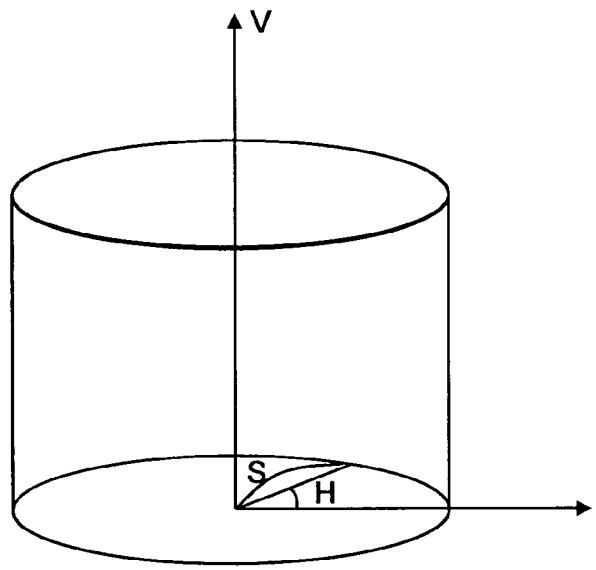
FIG. 5 is a diagram illustrative of an HSV color space.
FIG. 6 is a diagram illustrative of an example of kernels f(i,j) for convolutional calculations.

FIG. 5 is a diagram illustrative of the HSV color space.

A vertical axis (V-axis) shown in FIG. 5 represents luminance V. In the HSV color space shown in FIG. 5, saturation (also referred to as chroma) S is represented by a distance from the V-axis. Hue H is represented by an angle around the V-axis of a predetermined axis (an axis directed to the right in FIG. 5) which is perpendicular to the V-axis. If red is represented by H=0°, then green by H=120°. As shown in FIG. 5, hue H and saturation S remain unchanged even if luminance V changes in the HSV color space.

First color converter 2 converts the R, G, B components of captured image data 1 into a luminance component and a chromaticity component in the HSV color space according to conversion formulas shown below. As described above, first color converter 2 may perform the converting process per pixel. In the conversion formulas shown below, R, G, B, H, S, V take a value ranging from 0 to 1. Therefore, if R, G, B are expressed by 8 bits, then a preprocessing process may be performed to keep the values of R, G, B in a range from 0 to 1, and then the conversion formulas shown below may be applied. If H, S, V are expressed by 8 bits, then H, S, V determined by the conversion formulas shown below may be converted into 8-bit values.

First, first color converter 2 calculates luminance V according to V=max(R,G,B) where max(R,G,B) represents a maximum one of the values R, G, B. In other words, a maximum one of the values R, G, B is used as luminance V.

First color converter 2 calculates X according to X=min(R,G,B) where min(R,G,B) represents a minimum one of the values R, G, B. In other words, a minimum one of the values R, G, B is used as X.

Then, first color converter 2 calculates saturation S according to S=(V−X)/V, and further calculates r, g, b according to the following equations:

$$r=(V-R)/(V-X)$$

$$g=(V-G)/(V-X)$$

$$b=(V-B)/(V-X)$$

Then, first color converter 2 calculates h according to h=5+b if R=V and G=X, calculates h according to h=1−g if R=V and B=X, calculates h according to h=1+r if G=V and B=X, calculates h according to h=3−b if G=V and R=X, calculates h according to h=3+g if B=V and R=X, and calculates h according to h=5−r if B=V and G=X.

First color converter 2 calculates hue H according to H=h/6 using h determined as described above.

First color converter 2 stores a chromaticity image, i.e., image data comprising data of a chromaticity component (hue H and saturation S), in chromaticity memory 32. First color converter 2 stores a luminance image, i.e., image data comprising data of luminance component V, in first luminance memory 31.

Then, filtering unit 4 filters luminance component V stored in first luminance memory 31 to derive data V'. Filtering unit 4 performs a ring-type filtering process for emphasizing a change in the luminance to generate an edge and not reflecting delicate changes such as photographic image shadows or the like. For example, filtering unit 4 performs the above filtering process by calculating V' according to the equation 1, shown below, for convolutional calculations.

$$V'(x, y) = mag \cdot \sum_{j=-2}^{2} \left\{ \sum_{i=-2}^{2} f(i, j) V(x+i, y+j) \right\}$$ [Equation 1]

Individual pixels are expressed by coordinate values (x,y) of x, y coordinates. The pixel value of each pixel (x,y) (i.e., the luminance of each pixel) contained in the luminance image is represented by V(x,y). According to the above equation, the pixel value of a pixel (x,y) produced by filtering V(x,y) is represented by V'(x,y).

A coefficient mag in the above equation is a coefficient with respect to all filter values. The filter values are values taken by kernels f(i,j) for convolutional calculations. A sufficiently large value is used as mag. For example, a value of 32 or greater may be used as mag.

Conditions to be satisfied by kernels f(i,j) for convolutional calculations will be described below with reference to FIG. 6.

FIG. 6 is a diagram illustrative of an example of kernels f(i,j) for convolutional calculations;

Kernels may be of positive values (filter values) in a central area of the table shown in FIG. 6 and negative values (filter values) in a peripheral area of the table, with the sum of the filter values being positive. As long as these kernels are of such a nature, they may not be identical to kernels f(i,j) shown in FIG. 6.

That the values f(i,j) are positive in the central area of the table means that f(i,j)>0 when at least i and j are of values intermediate between a maximum value and a minimum value which each of i, j can take. In the present example, the maximum value that i and j can take is 2, and the minimum value that i and j can take is −2. Therefore, when each of i and j is of an intermediate value of 0 between the maximum and minimum values, f(0,0)=13, which is a positive value. Consequently, the condition that f(0,0)>0 when at least i and j are of values intermediate between a maximum value and a minimum value which each of i, j can take (the condition that the values f(i,j) are positive in the central area of the table) is satisfied.

That the values f(i,j) are negative in the peripheral area of the table means that f(i,j)<0 when at least i is of a maximum value or a minimum value which i can take or j is of a maximum value or a minimum value which j can take. In other words, f(i,j)<0 when at least one of i and j is of a maximum value or a minimum value thereof. In the present example, all the kernel values produced when at least one of i and j is of a maximum value (2) or a minimum value (−2) thereof are indicated in the outermost rows and columns of the table shown in FIG. 6, and any of those values are negative. Consequently, the condition that f(i,j)<0 when at least one of i and j is of a maximum value or a minimum value thereof (the condition that the values f(i,j) are negative in the peripheral area of the table) is satisfied.

That the sum of the filter values are positive means that the sum of the values f(i,j) depending on i, j are positive. Since the sum of the values f(i,j) shown in FIG. 6 is 1 and hence positive, the kernels shown in FIG. 6 satisfy this condition.

The convolutional calculations may be convolutional calculations using the kernels satisfying the above conditions, and are not limited to the convolutional calculations using the same kernels as the kernels f(i,j) shown in FIG. 6.

A filter wherein the non-zero kernel values are isotropic is referred to as a ring-type filter.

After filtering unit 4 calculates data V' for each pixel according to the filtering process by performing the above convolutional calculations, filtering unit 4 stores data V' in second luminance memory 33.

Second luminance memory 5 uses data V' stored in second luminance memory 33 as a luminance component in the HSV color space, and converts the luminance component and the chromaticity component in the HSV color space into R, G, B components according to conversion formulas shown below. In the conversion formulas shown below, R, G, B, H, S, V take a value ranging from 0 to 1. Therefore, if H, S, V are expressed by 8 bits, then second color converter 5 may perform a preprocessing process to keep the values of H, S, V in a range from 0 to 1, and then apply the conversion formulas shown below. If R, G, B (R, G, B in illustration image data 6) are expressed by 8 bits, then second color converter 5 may convert R, G, B determined by the conversion formulas shown below into 8-bit values.

First, second color converter 5 calculates h according to h=6·H using hue H. Then, second color converter 5 regards integer part of h as I. Furthermore, second color converter 5 calculates F, M, N, K according to the following equations:

$$F = h - I$$

$$M = V \cdot (1 - S)$$

$$N = V \cdot (1 - S \cdot F)$$

$$K = V \cdot (1 - (S \cdot (1 - F)))$$

Then, second color converter 5 determines R, G, B depending on the value of I as follows:

When I=0, second color converter 5 establishes (R, G, B)=(V, K, M), i.e., determines R, G, B such that R=V, G=K, B=M.

When I=1, second color converter 5 establishes (R, G, B)=(N, V, M), i.e., determines R, G, B such that R=N, G=V, B=M.

When I=2, second color converter 5 establishes (R, G, B)=(M, V, K), i.e., determines R, G, B such that R=M, G=V, B=K.

When I=3, second color converter 5 establishes (R, G, B)=(M, N, V), i.e., determines R, G, B such that R=M, G=N, B=V.

When I=4, second color converter 5 establishes (R, G, B)=(K, M, V), i.e., determines R, G, B such that R=K, G=M, B=V.

When I=5, second color converter 5 establishes (R, G, B)=(V, M, N), i.e., determines R, G, B such that R=V, G=M, B=N.

Second color converter 5 converts data V' comprising hue H, saturation S, and luminance for each pixel into R, G, B, as described above, to generate illustration image data 6. Second color converter 5 then stores illustration image data 6 in image memory 53. The above process concludes step S2.

When the converting process in step S2 is performed, the number of colors of the image represented by the image data is reduced, and captured image data 1 are converted into illustration image data 6 representing an illustration-like image. The converting process in step S2 emphasizes the edge of the image.

According to the first embodiment, mobile phone 50 converts image data of an actually captured image into illustration image data, and sends the illustration image data to mobile phone 60. Mobile phone 60 displays a picture-like (illustration-like) image based on the illustration image data.

Therefore, if the image of the speaker is captured, then the party who the speaker is talking to can identify the speaker.

Since the illustration-like image of the speaker is displayed on the mobile phone of the party who the speaker is talking to, even if the party is a speaker's superior such as a supervisor or the like, the speaker will not be judged as frivolous by the speaker's superior, and hence the communications will not be adversely affected.

As the image data of the actually captured image of the speaker are converted into illustration image data, delicate facial expressions of the speakers can be conveyed to the party who the speaker is talking to.

Accordingly, the first exemplary embodiment makes it possible to realize good communications.

According to the first exemplary embodiment, furthermore, the image data as a whole are converted such that the number of colors is reduced. Therefore, there is no need for a process for recognizing which area represents the face and extracting feature points, unlike the technology disclosed in Patent Document 1. As a result, the processing burden is reduced.

In the first exemplary embodiment, an image data generator is implemented by image input device 57 of mobile phone 50. An image data converter is implemented by communication image generator 52 of mobile phone 50. An image display is implemented by image display 56 of mobile phone 60.

Modifications of the video communication system according to the first exemplary embodiment will be described below.

(Modification 1)

According to the first exemplary embodiment, of the components obtained by the converting process of first color converter 2, only luminance V is filtered, and the chromaticity (hue H and saturation S) is not processed.

According to modification 1, saturation S is also processed. Specifically, saturation S is processed by an emphasizing process which does not change the value of S or an emphasizing process which changes the value of S to a greater value, depending on the value of S. Modification 1 is different from the sequence shown in FIG. 3 as to the process of communication image generator 52, but is the same as the first exemplary embodiment as to other details.

Figure 7:
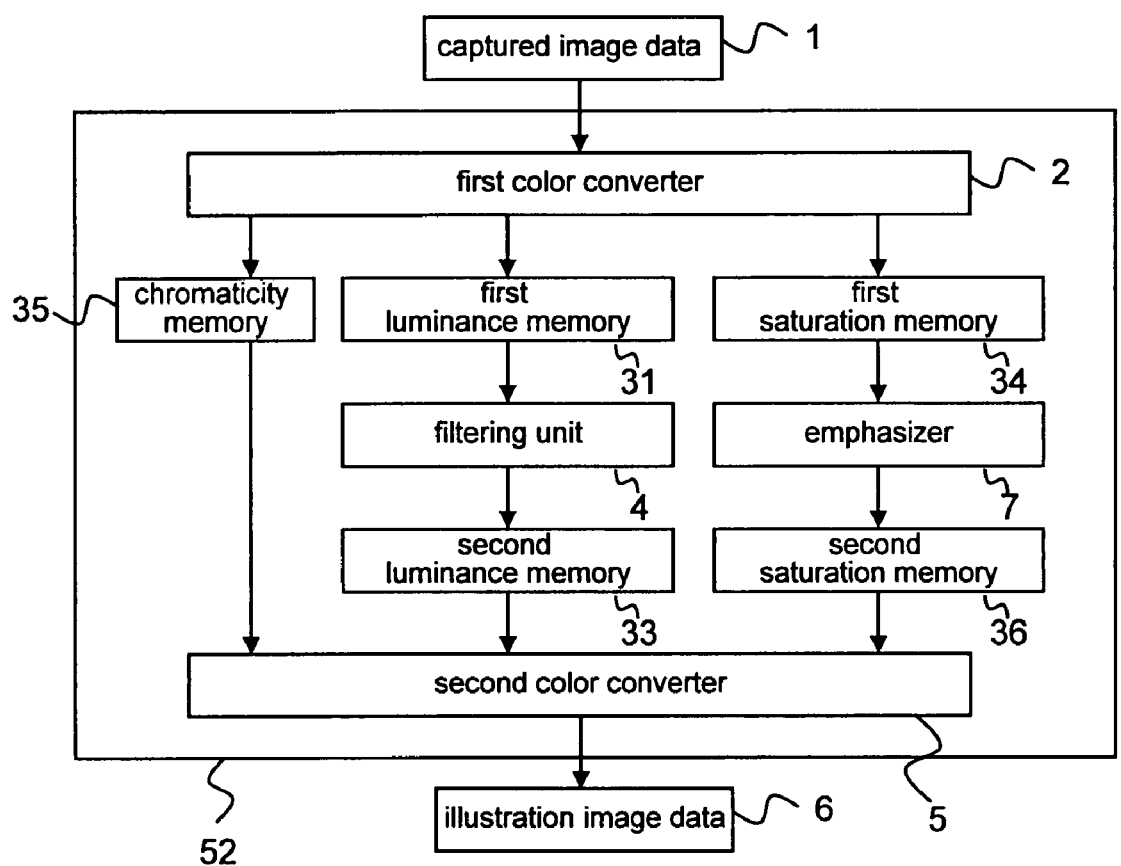
FIG. 7 is a block diagram of an arrangement of a communication image generator according to modification 1 of the first exemplary embodiment of the present invention.

FIG. 7 is a block diagram of an arrangement of communication image generator 52 according to modification 1 of the first exemplary embodiment of the present invention.

As shown in FIG. 7, communication image generator 52 comprises first color converter 2, chromaticity memory 35, first saturation memory 34, first luminance memory 31, emphasizer 7, filtering unit 4, second saturation memory 36, second luminance memory 33, and second color converter 5. Those components which performs the same process as the sequence shown in FIG. 3 are denoted by identical reference characters, and will not be described in detail below.

First color converter 2, emphasizer 7, filtering unit 4, and second color converter 5 may be implemented by the CPU incorporated in mobile phone 50. Alternatively, first color converter 2, emphasizer 7, filtering unit 4, and second color converter 5 may each be implemented by a dedicated LSI circuit separate from the CPU.

As with first color converter 2 shown in FIG. 3, first color converter 2 converts components of captured image data 1 into a luminance component and a chromaticity component for each pixel. The chromaticity component includes hue and saturation. First color converter 2 separates hue and saturation from each other and stores them in a memory. Specifically, first color converter 2 stores the data of hue H of each pixel, obtained by converting captured image data 1, in hue memory 35, and stores the data of saturation S of each pixel, obtained by converting captured image data 1, in first saturation memory 34. In the same manner as described above, first color converter 2 stores the data of luminance V of each pixel in first luminance memory 31. According to modification 1, therefore, first color converter 2 converts captured image data 1 into luminance, saturation, and hue.

Furthermore, first color converter 2 converts the components of captured image data 1 into a luminance component and a chromaticity component in a color space wherein the chromaticity (saturation and hue) does not change even if the luminance changes or a color space wherein the chromaticity (saturation and hue) changes little even if the luminance changes. As described above, the color space wherein the chromaticity (saturation and hue) changes little even if the luminance changes means "a color space wherein the range of chromaticity (saturation and hue) does not become nil (does not converge to one point) when the luminance is of a maximum value which the luminance can take".

Hue memory 35 stores the data of hue component H obtained by the converting process performed by first color converter 2.

First saturation memory 34 stores the data of saturation component S obtained by the converting process performed by first color converter 2.

First luminance memory 31 stores the data of luminance component V obtained by the converting process performed by first color converter 2.

Emphasizer 7 performs an emphasizing process which does not change the value of S or an emphasizing process which changes the value of S to a greater value, depending on the value of each S stored in first saturation memory 34. Emphasized saturation S is represented by S'. The emphasizing processes performed by emphasizer 7 will be described later. Emphasizer 7 stores emphasized saturation S' in second saturation memory 36.

Second saturation memory 36 stores data S' derived by emphasizer 7.

Second color converter 5 performs a converting process which is an inversion of the converting process performed by first color converter 2, using data V' stored in second luminance memory 33 as a luminance component, the data of saturation component S' stored in second saturation memory 35, and the data of hue component H stored in hue memory 35. Specifically, second color converter 5 converts the image data represented by the luminance component and the chromaticity component in the HSV color space into image data expressed by three primaries that are represented by R, G, B.

Operation of communication image generator 52 according to modification 1 (operation in step S2 shown in FIG. 4) will be described below.

When first color converter 2 (see FIG. 7) reads captured image data 1 expressed according to the RGB format of three primaries from image memory 53 (see FIG. 2), first color converter 2 converts captured image data 1 into luminance component V, saturation component H, and hue component H in the HSV color space for each pixel. This converting process of first color converter 2 is the same as the converting process of first color converter 2 shown in FIG. 3. First color converter 2 stores the data of hue component H of each pixel in hue memory 35. Similarly, first color converter 2 stores the data of saturation component S of each pixel in first saturation memory 34, and stores the data of luminance component V of each pixel in first luminance memory 31.

Then, filtering unit 4 performs a filtering process to convert the data of luminance component V into V', and stores data V' in second luminance memory 33. This filtering process is the same as the filtering process of filtering unit 4 shown in FIG. 3.

Emphasizer 7 performs an emphasizing process on saturation component S of each pixel stored in first saturation memory 34, and stores emphasized saturation component S' in second saturation memory 36.

For example, emphasizer 7 performs the emphasizing process as follows: Emphasizer 7 reads the value of saturation component S from first saturation memory 34. Emphasizer 7 compares the value of saturation component S with a predetermined threshold (represented by th). If S is smaller than threshold th, then emphasizer 7 determines S' according to S'=S. If S is equal to or greater than threshold th, then emphasizer 7 determines the value of S' as a value (represented by Smax) close to a maximum value or a minimum value that S can take. For example, it is assumed that th=32, S can take a value in the range from 0 to 255, and Smax=255. If S<32, then emphasizer 7 determines S' according to S'=S. If S≧32, then emphasizer 7 determines S' according to S'=255.

By performing the emphasizing process for determining S' according to S'=Smax when the value of S is equal to or greater than threshold th, final illustration image data 6 can be generated as data of an image in a highly bright color, like a picture drawn by a child.

In the above example, S'=Smax when the value of S is equal to or greater than threshold th. However, emphasizer 7 may determine a value of S' according to function S'=g(S) which makes S' change gradually as the value of S changes. Examples of function S' are shown below. In these examples, S can take a value in the range from 0 to 255.

$S'=S$ (when $S<32$)
$S'=4 \cdot S-96$ (when $32 \leq S \leq 87$)
$S'=255$ (when $S \geq 88$)

For deriving S' according to the above function, values of S' depending on the 256 values of S ranging from 0 to 255 are calculated in advance. The values of S and the values of S' depending on the values of S are associated with each other and stored in a lookup table (not shown). Emphasizer 7 may derive a value of S' depending on the value of S by referring to the lookup table.

After the filtering process of filtering unit 4 and the emphasizing process of emphasizer 7, second color converter 5 performs a converting process which is an inversion of the converting process performed by first color converter 2, using the data V' stored in second luminance memory 33 as a luminance component, the data of saturation component S' stored in second saturation memory 35, and the data of hue component H stored in hue memory 35. The converting process of first color converter 2 is the same as the converting process of second color converter 5 shown in FIG. 3, except that saturation component S' is used instead of saturation component S.

(Modification 2)

Modification 2 is different as to the process of communication image generator 52, but is the same as the first exemplary embodiment as to other details. Communication image generator 52 according to modification 2 may be implemented by the CPU incorporated in mobile phone 50 or may be implemented by an LSI circuit separate from the CPU.

Figure 8:
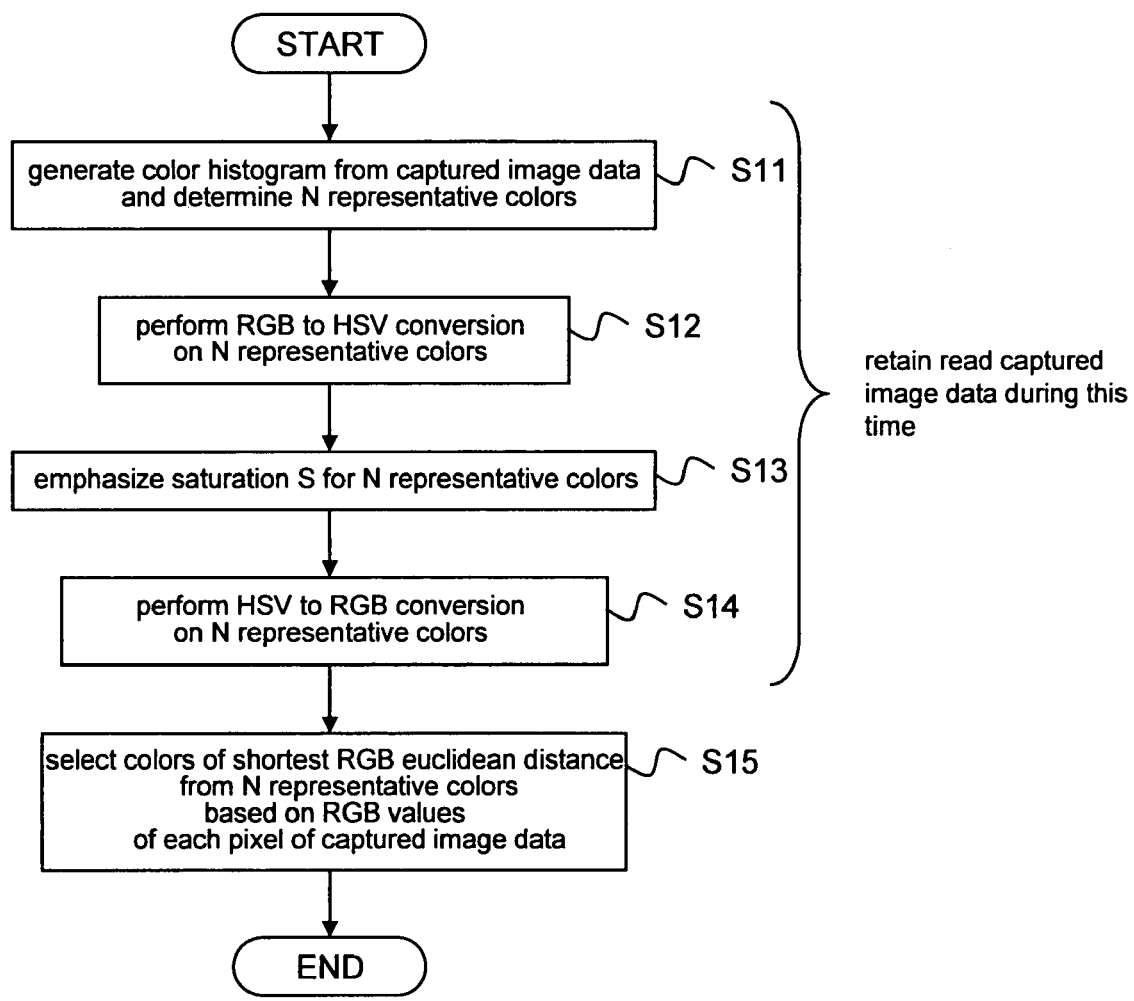
FIG. 8 is a flowchart of an operation sequence of a communication image generator according to modification 2 of the first exemplary embodiment of the present invention.
Figure 9:
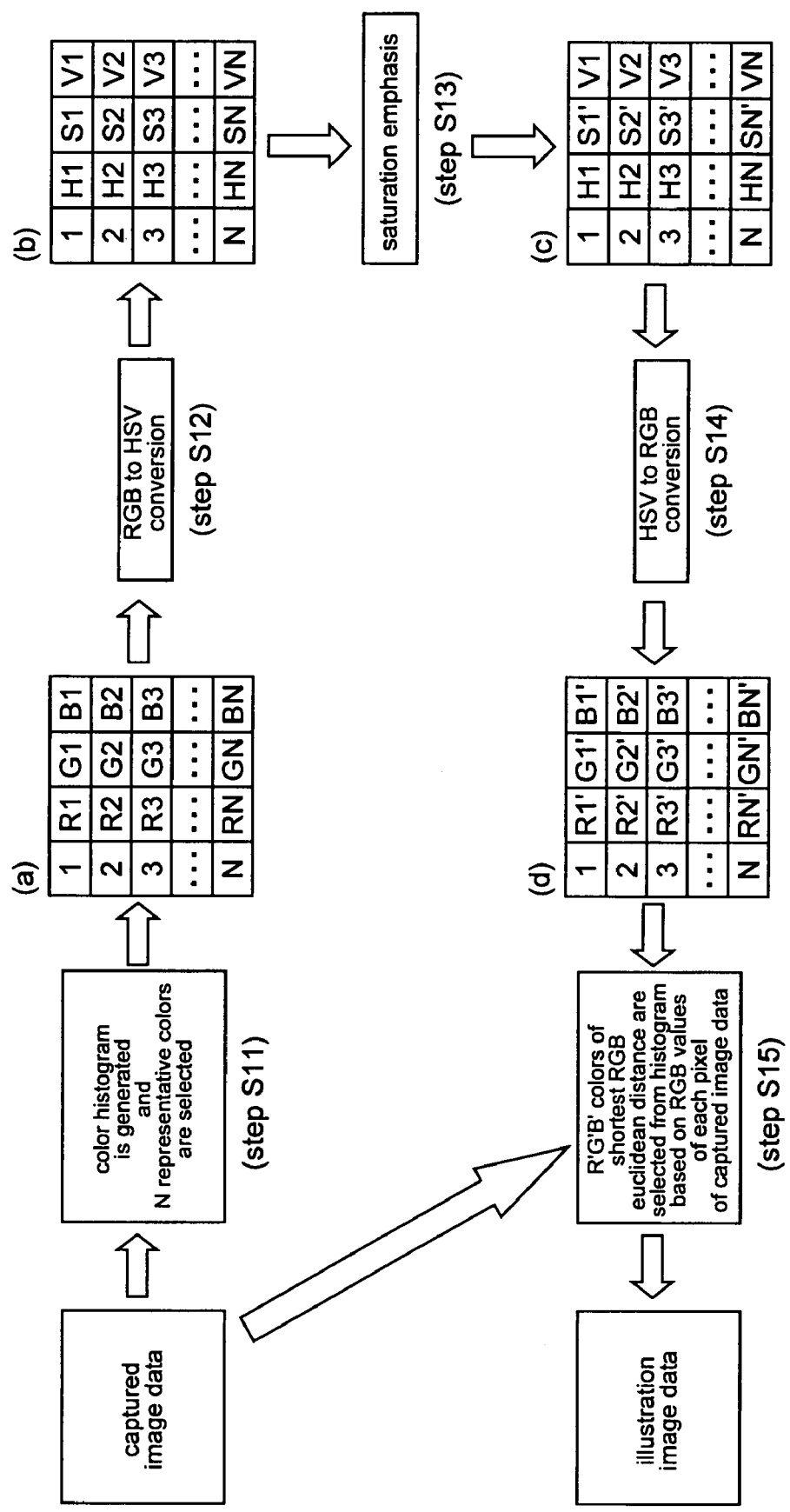
FIG. 9 is a diagram illustrative of examples of representative colors converted by the communication image generator according to modification 2 of the first exemplary embodiment of the present invention.

FIG. 8 is a flowchart of an operation sequence of communication image generator 52 according to modification 2. FIG. 9 is a diagram illustrative of examples of representative colors converted by communication image generator 52 according to modification 2. It is assumed that captured image data 1 are expressed according to the RGB format.

As shown in FIG. 8, when communication image generator 52 reads the captured image data from image memory 53, communication image generator 52 generates a color histogram of the captured image data, and selects more prevalent colors, up to the Nth color, for example, contained in the captured image data as representative colors (step S11). The N representative colors may be selected differently, e.g., may be selected at random from the color histogram. Alternatively, colors close to each other may be selected as the N representative colors. Communication image generator 52 holds the captured image data read from image memory 53 during steps S11 through S14.

One example of the N representative colors selected in step S11 is shown in FIG. 9(a). As shown in FIG. 9(a), if more prevalent colors, up to the Nth color, contained in the captured image data as representative colors, then each of the N colors is expressed as a combination of R, G, B.

Then, communication image generator 52 converts the N representative colors each expressed as a combination of R, G, B into colors in the HSV format (step S12). In step S12, the captured image data that have been read are not converted per se, but each of the N combinations of R, G, B representing the representative colors is converted into colors in the HSV format.

An example of the N representative colors converted in step S12 is shown in FIG. 9(b). Each of the colors is expressed by a combination of H, S, V.

Then, communication image generator 52 emphasizes saturation S of each of the N representative colors (step S13). For example, communication image generator 52 multiplies saturation S by a coefficient ks in the form of a real number of 1.0 or greater to derive emphasized saturation S'. Specifically, communication image generator 52 determines emphasized saturation S' according to the following equation:

$$S'=ks \cdot S$$

Alternatively, the emphasizing process using the threshold or the process using function g(s) as described above may be employed.

It is assumed that each of the components such as saturation, etc. takes a value ranging from 0 to 1 for the conversion between the RGB format and the HSV format. Therefore, the upper limit for S' is 1. If the value of S' calculated by the above equation exceeds 1, then communication image generator 52 sets S' to S'=1. In step S13, communication image generator 52 does not convert hue H and luminance V.

An example of the N representative colors converted in step S13 is shown in FIG. 9(c). A comparison with FIG. 9(b) indicates that only saturation S has changed (specifically, its value has increased). If ks=1, then saturation S does not change, and hence the representative colors do not change. However, even if ks=1 and the representative colors do not change, it is possible to convert the captured image data into illustration image data. Though ks has been described as being a real number of 1.0 or greater, ks may be of any positive real number. If ks is a positive real number smaller than 1.0, then S' is smaller than S. In this case, the captured image data can also been converted into illustration image data.

Then, communication image generator 52 converts the N representative colors expressed in the HSV format after step S13 into colors in the RGB format (step S14).

An example of the N representative colors converted in step S14 is shown in FIG. 9(d). As shown in FIG. 9(d), the representative colors after step S14 are expressed as combinations of R, G, B.

In the processing sequence up to step S14, communication image generator 52 holds the captured image data read from image memory 53.

In step S15, communication image generator 52 converts the captured image data. In step S15, communication image generator 52 selects representative colors having the shortest RGB Euclidean distance for each pixel based on R, G, B of each pixel of the captured image data and R, G, B of the N representative colors obtained in step S14. Then, communication image generator 52 replaces the values of R, G, B of each pixel with the values of R, G, B of the representative colors selected as the representative colors having the shortest RGB Euclidean distance.

Then, communication image generator 52 stores the image data converted from the captured image data as illustration image data in the image memory (step S15).

According to the processing of step S15, the color of each pixel of the captured image data is changed to any one of the N representative colors, so that the number of colors is reduced. The image data (illustration image data) converted in step S15 represent an illustration-like image.

According to the flowchart shown in FIG. 8, the captured image data are retained as they are during steps S11 through S14. However, during steps S11 through S14, a blurring process may be performed on the captured image data. A flowchart of such a blurring process is shown in FIG. 10.

Figure 10:
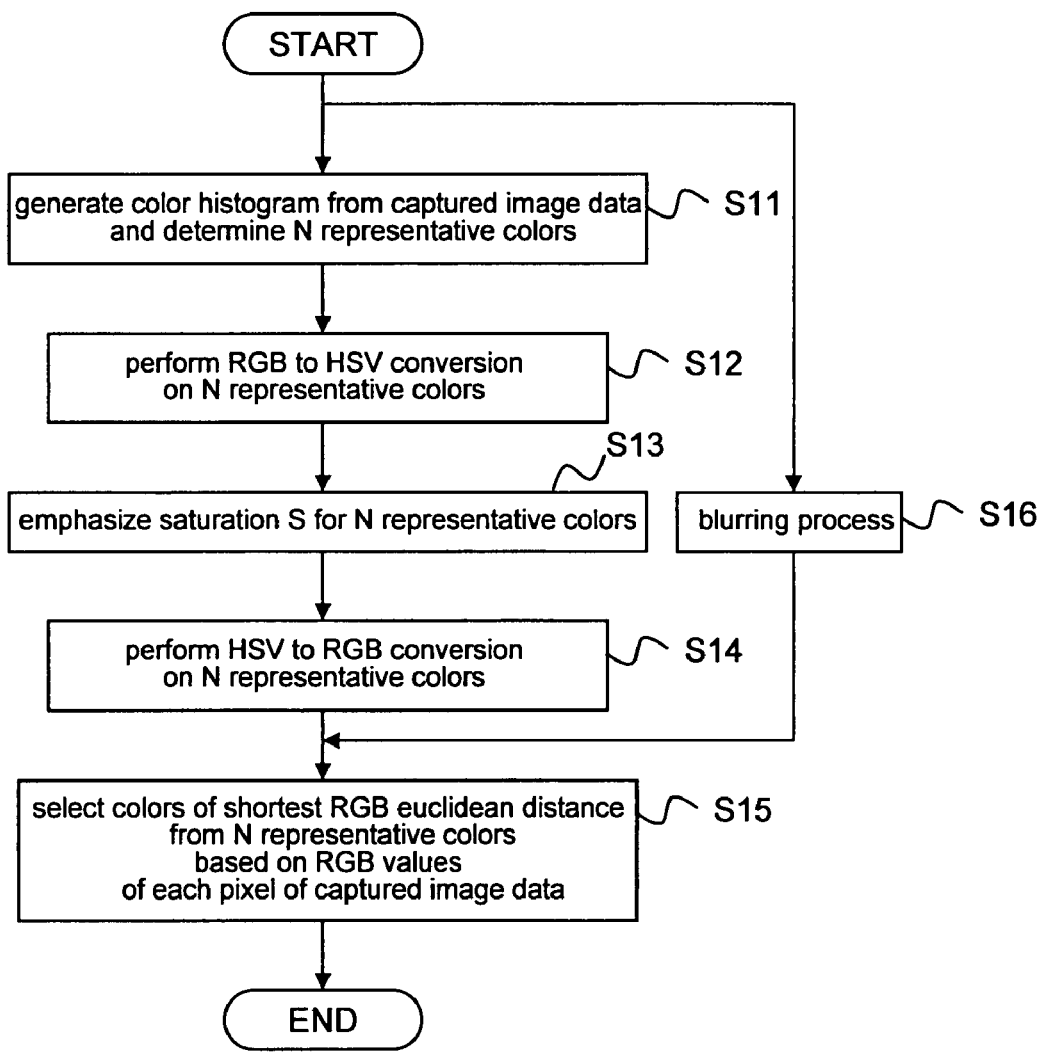
FIG. 10 is a flowchart of another operation sequence of the communication image generator according to modification 2 of the first exemplary embodiment of the present invention.

Steps S11 through S15 shown in FIG. 10 are identical to the corresponding processing steps shown in FIG. 8. Communication image generator 52 performs a blurring process on the captured image data using a two-dimensional filter (step S16) before it executes step S15. Specifically, communication image generator 52 replaces the value of R of each pixel with the average of the values of R of the pixel and those pixels surrounding the pixel. Similarly, communication image generator 52 replaces the values of G, B of each pixel with the averages of the values of G, B of the pixel and those pixels surrounding the pixel. Thereafter, step S15 is executed.

In the description of FIGS. 8 through 10, the RGB format is converted into the HSV format, saturation S is emphasized, and then the HSV format is converted back into the RGB format. However, the RGB format may be converted into the format of the uniform LCH color space, saturation C of the converted image data may be emphasized, and then the format of the uniform LCH color space may be converted back into the RGB format.

For emphasizing saturation C in the format of the uniform LCH color space, communication image generator 52 multiplies saturation C by a coefficient kc in the form of a real number greater than 1.0 to calculate emphasized saturation C'. Specifically, communication image generator 52 determines emphasized saturation C' according to the following equation:

$$C'=kc \cdot C$$

As there is no upper limit prescribed for saturation C in the uniform LCH color space, C' calculated according to the above equation may be used as the emphasized saturation. The other emphasizing process described with respect to saturation S can also be employed.

The RGB format may be converted into the format of the uniform LCH color space by a known converting process. For example, the RGB format may be converted into the L*a*b* format, and the L*a*b* format may be converted into the L*C*abhab format, as described in Non-patent Document 3. In this case, C*ab in the L*C*abhab format corresponds to saturation C in the uniform LCH color space. Alternatively, the RGB format may be converted into the L*u*vv format, rather than the L*a*b* format, and the L*u*vv format may be converted into the L*C*uvhuv format, as described in Non-patent Document 3. In this case, C*uv in the L*C*uvhuv format corresponds to saturation C in the uniform LCH color space. For converting the uniform LCH color space back into the RGB format, the L*C*abhab format (L*C*uvhuv format) may be converted into the L*a*b* format (L*u*v format), and the L*a*b* format (L*u*v format) may be converted into the RGB format.

(Modification 3)

In the above description, mobile phone 50 sends the illustration image data to mobile phone 60.

According to modification 3, mobile phone 50 changes the image data to be sent from the illustration image data to the captured image data in response to a request from mobile phone 60.

Furthermore, mobile phone 50 controls parameters of the illustration-like image conversion to change the degree of the illustration-like expression of the illustration image data (the degree of the conversion performed by communication image generator 52) for thereby generating image data to be sent. Foe example, according to a color reduction process, if the number N of representative colors is increased, the image data becomes closer to the real image, and if the number N of representative colors is reduced, then the illustration-like expression of the illustration image is intensified. Alternatively, in order to be able to handle a plurality of stepwise requests for a real image, a less illustration-like image, and a more illustration-like image, filters and parameters representing the number of representative colors optimum for those requests may be determined in advance, and the parameters may be changed according to a designated one of the requests to generate image data to be sent.

The arrangement according to modification 3 may be the same as the arrangement according to the first exemplary embodiment or the arrangement according to modification 1 or 2. However, central controller 51 of mobile phone 50 is also operable to change the image data to be sent to the captured image data or to change the degree of the conversion performed by communication image generator 52 (the degree of the illustration-like expression) in response to a request from mobile phone 60.

Operation of the video communication system according to modification 3 will be described below.

After the start of a communication session, mobile phone 50 converts captured image data into illustration image data and sends the illustration image data to mobile phone 60, as with the first exemplary embodiment or modification 1 or 2.

Mobile phone 60 displays an illustration-like image based on the illustration image data. As a result, the speaker using mobile phone 60 can talk to the speaker using mobile phone 50 while viewing the illustration-like image of the speaker using mobile phone 50.

While in the communication session, the speaker using mobile phone 60 may want to see an image having a illustration-like expression changed by the will of the speaker using mobile phone 60 or may want to see the actual image of the speaker using mobile phone 50, rather than the illustration-like image set by the speaker using mobile phone 50. In such a case, the speaker using mobile phone 60 inputs an instruction to send an image data changing request to mobile phone 50, through a key pad (not shown), in the communication session. When the instruction is input, mobile phone 60 sends the image data changing request to mobile phone 50. At this time, the central controller of mobile phone 60 controls the wireless device to send the changing request. The changing request is sent via base station 92, network 93, and base station 91 to mobile phone 50.

When central controller 51 of mobile phone 50 receives the changing request from mobile phone 60, central controller 51 stops the converting process performed by communication image generator 52 (in step S2 shown in FIG. 4). In step S3 (see FIG. 4), central controller 51 reads the captured image data from the image memory, and controls wireless device 54 to send the captured image. Alternatively, according to the changing request, central controller 51 may control communication image generator 52 to change the degree of the illustration-like expression (the degree of the conversion) and convert the captured image data into illustration image data based on the changed degree, and may control wireless device 54 to send the image data converted by communication image generator 52. Under the control of central controller 51, wireless device 54 sends the captured image data or the image data converted by communication image generator 52 to mobile phone 60.

When central controller 51 of mobile phone 50 receives the changing request, central controller 51 may control image display 56 to display a screen for prompting the speaker to enter an input indicative of whether the image data to be sent may be changed according to the changing request or not. In such a case, central controller 51 changes the image data to be sent according to the changing request only when the speaker enters an input indicating that the image data to be sent may be changed according to the changing request. For example, central controller 51 changes the image data to be sent from the illustration image data to the captured image data, or changes the degree of the conversion from the captured image data into the illustration image data.

Mobile phone 60 receives the image data sent from mobile phone 50, and displays an image based on the image data from mobile phone 50. As a consequence, the speaker using mobile phone 60 can see the captured image of speaker using mobile phone 50, or can see an image whose illustration-like expression has changed depending on the changing request sent from mobile phone 60.

The amount of the illustration image data is smaller than the amount of the captured image data because the number of colors is smaller in the illustration image data than in the captured image data. If the amount of data sent depending on the changing request from mobile phone 60 increases, then the cost of communications also increases. The increase in the cost of communications or the entire cost of communications may be borne by the speaker using mobile phone 60. Communication cost management according to modification 3 will be described below.

Figure 11:
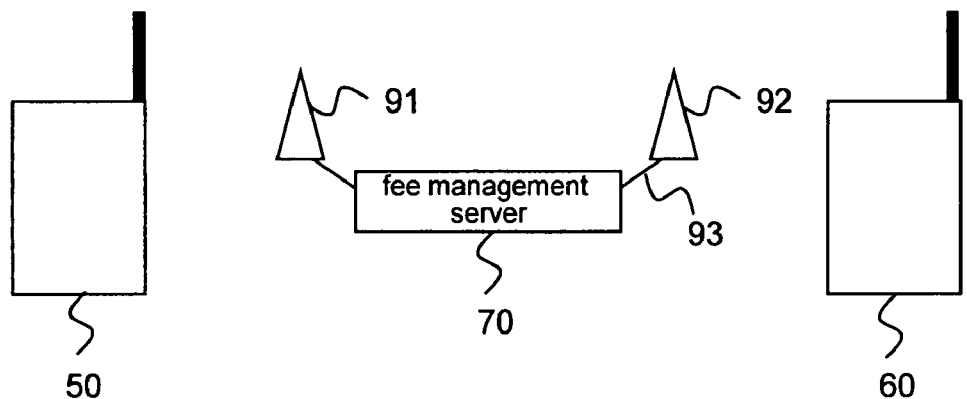
FIG. 11 is a diagram showing an arrangement of a video communication system according to modification 3 of the first exemplary embodiment of the present invention.

FIG. 11 is a diagram showing an arrangement of a video communication system according to modification 3 of the first exemplary embodiment of the present invention.

As shown in FIG. 11, the video communication system according to modification 3 includes fee management server 70 connected to network 93 between base stations 91, 92.

Fee management server 70 calculates a communication fee and manages a process of determining which mobile phone speaker should be charged with the communication fee. Fee management server 70 is installed by the carrier. Image data, speech data, and changing requests sent and received during communication sessions pass through fee management server 70.

Figures 12, 13A, 13B:
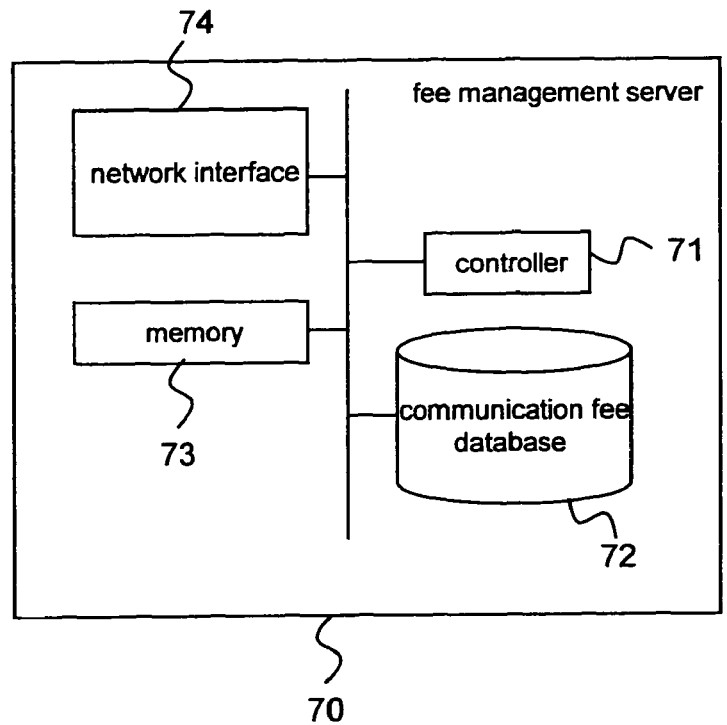
FIG. 12 is a block diagram of an arrangement of a fee management server according to modification 3 of the first exemplary embodiment of the present invention.
FIGS. 13(a) and 13(b) are diagrams showing examples of communication fees in the video communication system according to modification 3 of the first exemplary embodiment of the present invention.

FIG. 12 is a block diagram of an arrangement of fee management server 70 according to modification 3 of the first exemplary embodiment of the present invention.

As shown in FIG. 12, fee management server 70 comprises controller 71, communication fee database 72, memory 73, and network interface 74.

Controller 71 operates according to a program stored in memory 73. Network interface 74 is an interface with network 93 (see FIG. 11). Fee management server 70 is connected to network 93 through network interface 74.

Communication fee database 72 stores communication fees to be paid respectively by the speakers using mobile phones 50, 60.

When a communication session starts through network 93, controller 71 calculates a communication fee depending on the amount of image data sent and received and the communication time. Controller 71 assigns the communication fee to the speaker who is to be charged, and stores information of the communication fee in communication fee database 72.

Controller 71 determines a communication fee incurred until a changing request is received as a fee to be billed to the speaker using mobile phone 50 who has requested the start of the communication session. Controller 71 determines a communication fee, either partly or entirely, incurred after a changing request is received as a fee to be billed to the speaker using mobile phone 60 who has sent the changing request, and determines any remaining communication fee as a fee to be billed to the speaker using mobile phone 50 who has requested the start of the communication session.

FIG. 13(*a*) is a diagram showing an example of communication fees for illustration image data sent and received and captured image data sent and received. The communication fees shown in FIG. 13 are communication fees per minute.

As shown in FIG. 13(*a*), when illustration image data are sent, the communication fee for sending the illustration image data from mobile phone 50 to fee management server 70 is 3 yen per minute, and the communication fee for sending the illustration image data from fee management server 70 to mobile phone 60 is 3 yen per minute. Therefore, the communication fee for sending the illustration image data from mobile phone 50 to mobile phone 60 is 6 yen per minute.

The communication fee for the captured image data is higher as the amount of captured image data is greater. When captured image data are sent, the communication fee for sending the captured image data from mobile phone 50 to fee management server 70 is 5 yen per minute, and the communication fee for sending the captured image data from fee management server 70 to mobile phone 60 is 5 yen per minute. Therefore, the communication fee for sending the captured image data from mobile phone 50 to mobile phone 60 is 10 yen per minute. When captured image data are sent, the communication fee is higher by 4 yen (=10 yen−6 yen) per minute than when illustration image data are sent.

Controller 71 calculates a communication fee to charge the speaker using mobile phone 50 which sends image data with 6 yen per minute until controller 71 receives a changing request from mobile phone 60, and stores the communication fee to be billed to the speaker using mobile phone 50, in communication fee database 72. The speaker using mobile phone 60 which receives the image data does not bear the communication fee during this period.

FIG. 13(*b*) is a diagram showing an example of communication fees after mobile phone 60 has sent an image data changing request. Modes 1 through 3 shown in FIG. 13(*b*) represent communication fee sorting modes after controller 71 of fee management server 70 has received the changing request.

Controller 71 calculates communication fees for the respective speakers according to either one of modes 1 through 3 shown in FIG. 13(*b*), and stores the communication fees in communication fee database 72. Alternatively, controller 71 may calculate communication fees according to other modes.

Mode 1 is a mode wherein the speaker using mobile phone 50 is requested to pay the same amount (6 yen per minute) as before the changing request is received, and the speaker using mobile phone 60 which has sent the changing request is requested to pay a communication fee (4 yen per minute) which has been added due to the changed image data.

Mode 2 is a mode wherein the speaker using mobile phone 60 which has sent the changing request is requested to pay the entire communication fee (10 yen per minute) after the changing request has been sent. The speaker using mobile phone 50 which sends the image data does not need to bear the communication fee after it has started to send the captured image data in response to the changing request.

Mode 3 is a mode wherein the speaker using mobile phone 60 which has sent the changing request is requested to pay the entire communication fee (10 yen per minute) after the changing request has been sent and a fee (10 yen per minute) for viewing the captured image unchanged. Therefore, the speaker using mobile phone 60 is charged with 20 yen per minute. As shown in FIG. 13(*a*), the communication fee at the time the captured image data are sent is 10 yen per minute.

Controller 71 stores the difference of 10 yen per minute (=20 yen−10 yen) in communication fee database 72 such that it will be paid from the carrier to the speaker using mobile phone 50.

According to modification 3, a changing request sender is implemented by the central controller and the wireless device of mobile phone 60. A data-to-be-sent changer is implemented by central controller 51 of mobile phone 50. A communication fee calculator is implemented by controller 71 of fee management server 70.

In either one of modifications 1 through 3, mobile phone 50 converts the image data of the actually captured image of the speaker into illustration image data, and sends the illustration image data to mobile phone 60. Accordingly, good communications can be realized.

In either one of modifications 1 through 3, the entire image data are processed to reduce the number of colors. Therefore, there is no need for a process for recognizing which area represents the face and extracting feature points, unlike the technology disclosed in Patent Document 1. As a result, the processing burden is reduced.

In the above description, mobile phone 50 sends image data, and mobile phone 60 receives the image data and displays an image. However, each of mobile phones 50, 60 may send image data to the other, and display an image of the other party. In such a case, each of mobile phones 50, 60 may be of an identical structure including image input device 57 and communication image generator 52, and may be arranged to display an image based on the received image data.

2nd Exemplary Embodiment

According to the first exemplary embodiment, mobile phone 50 (see FIG. 1) which sends image data converts captured image data into illustration image data.

According to the second exemplary embodiment, mobile phone 60 (see FIG. 1) which receives image data receives captured image data and converts the captured image data into illustration image data. In the second exemplary embodiment, as with the arrangement shown in FIG. 1, mobile phones 50, 60 send and receive data via base station 91, network 93, and base station 93.

According to the second exemplary embodiment, mobile phone 50 may be devoid of communication image generator 52. Other details of mobile phone 50 are identical to those shown in FIG. 2.

Figure 14:
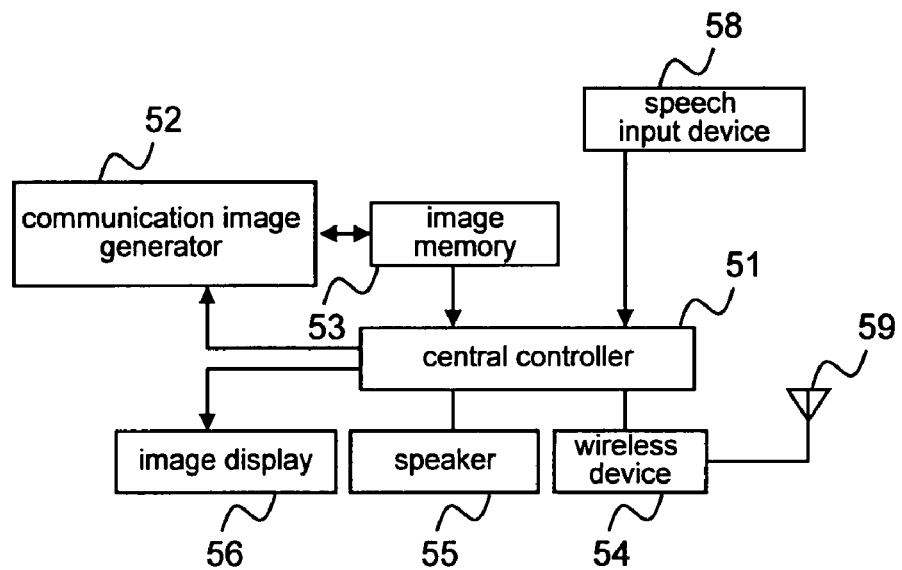
FIG. 14 is a block diagram of an arrangement of a mobile phone for receiving image data according to a second exemplary embodiment of the present invention.

FIG. 14 is a block diagram of an arrangement of mobile phone 60 for receiving image data according to the second exemplary embodiment of the present invention. Those parts of mobile phone 60 which are identical to those shown in FIG. 2 are denoted by identical reference characters, and will not be described in detail below.

As shown in FIG. 14, mobile phone 60 for receiving image data may not have an image input device. Communication image generator 52 of mobile phone 60 is the same as the communication image generator according to the first exemplary embodiment or modifications 1 through 3.

Operation of the video communication system according to the second exemplary embodiment will be described below. Though a moving image is captured in the description which follows, a captured image may be a still image.

Central controller 51 of mobile phone 50 controls image input device 57 to capture a moving image of the face of the speaker, for example, and stores the captured image data of the moving image in image memory 53. This process is the same as the process of step S1 according to the first exemplary embodiment.

Then, central controller 51 of mobile phone 50 reads the captured image data from the image memory, and controls wireless device 54 to send the captured image data. Under the control of central controller 51, wireless device 54 sends the captured image data to mobile phone 60. Mobile phone 50 repeats the above process to send the captured image data to mobile phone 60.

Wireless device 54 (see FIG. 14) of receiving mobile phone 60 receives the captured image data from mobile phone 50 via antenna 59. Central controller 51 of mobile phone 60 stores the received captured image data in image memory 53.

Communication image generator 52 of mobile phone 60 reads the captured image data from image memory 53, converts the captured image data into illustration image data, and stores the illustration image data in image memory 53. The process performed by communication image generator 52 of mobile phone 60 for converting the captured image data into the illustration image data is the same as the process for converting the captured image data into the illustration image data according to the first exemplary embodiment or modifications 1 through 3.

Central controller 51 reads the illustration image data from image memory 53, and controls image display 56 to display an image based on the illustration image data. As a result, the speaker using mobile phone 60 can see an illustration-like image.

According to the second exemplary embodiment, mobile phone 60 receives image data of an actually captured image of the speaker from mobile phone 50, and converts the captured image data into illustration image data. Mobile phone 60 displays an illustration-like image based on the illustration image data.

If a video image of the speaker using mobile phone 50 is sent, then good communications can be realized as with the first exemplary embodiment. As communication image generator 52 of receiving mobile phone 60 performs the converting process in the same manner as the converting process according to the first exemplary embodiment or modifications 1 through 3, the processing burden is reduced.

In the second exemplary embodiment, an image data generator is implemented by image input device 57 of mobile phone 50, an image data converter by communication image generator 52 of mobile phone 60, and an image display by image display 56 of mobile phone 60.

In the above description, mobile phone 50 sends captured image data, and mobile phone 60 receives the captured image data, converts the captured image data into illustration image data, and displays an illustration-like image. However, each of mobile phones 50, 60 may send image data to the other, and display an illustration-like image of the other party. In such a case, each of mobile phones 50, 60 may be of an identical structure including image input device 57 and communication image generator 52.

3rd Exemplary Embodiment

Figure 15:
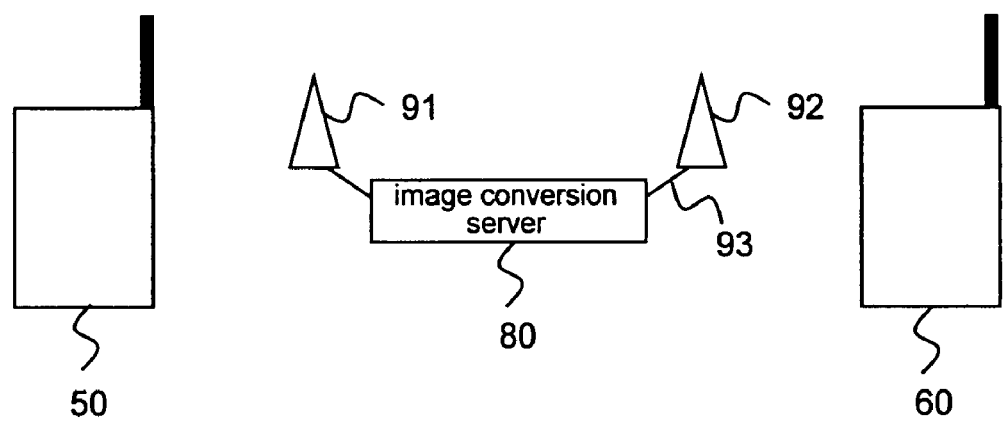
FIG. 15 is a diagram showing an arrangement of a video communication system according to a third exemplary embodiment of the present invention.

FIG. 15 is a diagram showing an arrangement of a video communication system according to a third exemplary embodiment of the present invention.

As shown in FIG. 15, the video communication system according to the third exemplary embodiment comprises mobile phones 50, 60, base stations 91, 92, and image conversion server 80 connected to network 93 between base stations 91, 92.

Image conversion server 80 is installed by the carrier.

Mobile phone 50 and mobile phone 60 send and receive data via base station 91, image conversion server 80 connected to network 93, and base station 92. Consequently, image data and speech data sent and received in a communication session pass through image conversion server 80.

According to the third exemplary embodiment, image conversion server 80 converts captured image data into illustration image data. It is assumed in the description which follows that mobile phone 50 sends image data to mobile phone 60.

According to the third exemplary embodiment, mobile phone 50 may be devoid of communication image generator 52. Other details of mobile phone 50 are identical to those shown in FIG. 2.

Mobile phone 60 may be a mobile phone capable of displaying image data received in a communication session. For example, mobile phone 60 comprises central controller 51, wireless device 54, speaker 55, image display 56, speech input device 58, and antenna 59 as with mobile phone 50. Central controller 51 of mobile phone 60 receives image data and speech data via wireless device 54 and antenna 59. Central controller 51 of mobile phone 60 also sends a signal representing speech data, etc. via wireless device 54 and antenna 59. Central controller 51 of mobile phone 60 displays an image based on the received image data on image display 56.

Mobile phone 50 sends captured image data via network 93 between base stations 91, 92. The captured image data are converted into illustration image data by image conversion server 80. Mobile phone 60 receives the illustration image data. Mobile phone 60 displays an illustration-like image of the speaker (the speaker using mobile phone 50) based on the illustration image data.

Figure 16:
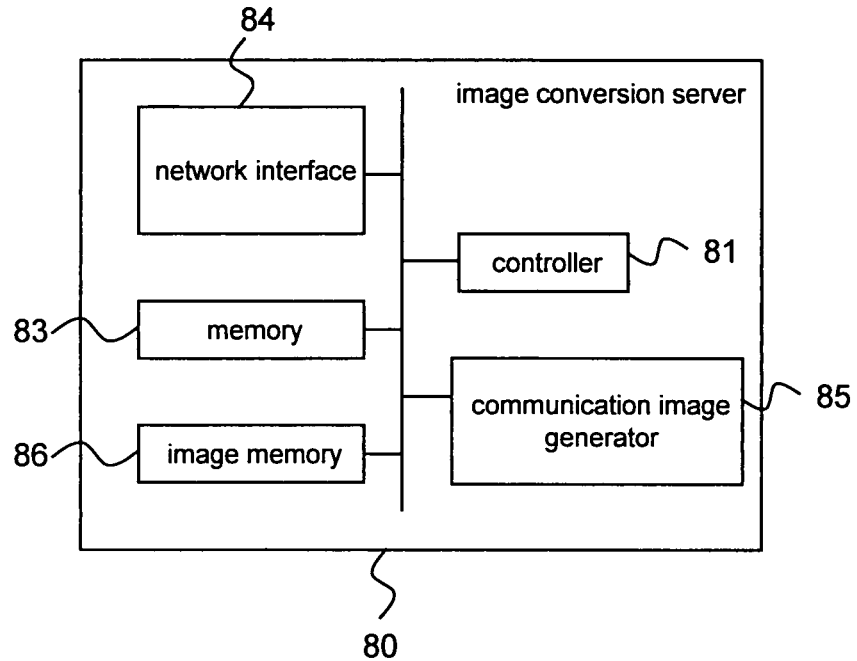
FIG. 16 is a block diagram showing an arrangement of an image conversion server according to the third exemplary embodiment of the present invention.

FIG. 16 is a block diagram showing an arrangement of image conversion server 80 according to the third exemplary embodiment of the present invention.

As shown in FIG. 16, image conversion server 80 comprises controller 81, memory 83, network interface 84, communication image generator 85, and image memory 86.

Controller 81 controls image conversion server 80 in its entirety. Controller 81 is a processing device which operates according to a program, for example.

Memory 83 stores the program.

Network interface 84 is an interface with network 93 (see FIG. 15) between the base stations. Image conversion server 80 is connected to network 93 through network interface 84.

Controller 81 receives captured image data sent from mobile phone 50, and stores the captured image data in image memory 8. When the captured image data are converted illustration image data by communication image generator 85, controller 81 sends the illustration image data to mobile phone 60.

Image memory 86 stores captured image data sent and received between mobile phones 50, 60. Image memory 86 also stores the illustration image data that are converted from the captured image data by communication image generator 85.

Communication image generator 85 reads the captured image data from image memory 86 and converts the captured image data into illustration image data. Communication image generator 85 stores the illustration image data in image memory 86. Communication image generator 85 is the same as the communication image generator according to the first exemplary embodiment or modifications 1 through 3. Communication image generator 85 may be implemented by the same processing device as controller 81.

Operation of the video communication system according to the third exemplary embodiment will be described below.

Though mobile phone 50 captures a moving image of the speaker in the description which follows, a captured image may be a still image.

Central controller 51 (see FIG. 2) of mobile phone 50 controls image input device 57 to capture a moving image of the face of the speaker, for example, and stores the captured image data of the moving image in image memory 53. This process is the same as the process of step S1 according to the first exemplary embodiment.

Then, central controller 51 of mobile phone 50 reads the captured image data from the image memory, and controls wireless device 54 to send the captured image data. Under the control of central controller 51, wireless device 54 sends the captured image data to mobile phone 60. Mobile phone 50 repeats the above process to send the captured image data to mobile phone 60.

Controller 81 (see FIG. 16) of image conversion server 80 receives the captured image data sent from mobile phone 50 to mobile phone 60 in network 93 between base stations 91, 92, and stores the captured image data in image memory 86.

Then, communication image generator 85 reads the captured image data from image memory 86, and converts the captured image data into illustration image data. The process performed by communication image generator 85 for converting the captured image data into the illustration image data is the same as the process for converting the captured image data into the illustration image data according to the first exemplary embodiment or modifications 1 through 3. Communication image generator 85 stores the illustration image data generated by the converting process in image memory 86.

Controller 81 reads the illustration image data generated by communication image generator 85 from image memory 86, and sends the illustration image data to mobile phone 60.

Image conversion server 80 repeats the above process to send the illustration image data to mobile phone 60.

When mobile phone 60 receives the illustration image data from image conversion server 80, mobile phone 60 displays an illustration-like image of the speaker using mobile phone 50 based on the illustration image data.

According to the third exemplary embodiment, image conversion server 80 receives image data of an actually captured image of the speaker from mobile phone 50, and converts the captured image data into illustration image data. Image conversion server 80 sends the illustration image data to mobile phone 60, which displays an illustration-like image of the speaker.

Therefore, as with the first exemplary embodiment, good communications can be realized. As communication image generator 85 of image conversion server 80 performs the converting process in the same manner as the converting process according to the first exemplary embodiment or modifications 1 through 3, the processing burden is reduced. According to the third exemplary embodiment, furthermore, since mobile phones 50, 60 do not need to convert captured image data into illustration image data, the processing burden of mobile phones 50, 60 is reduced.

In the third exemplary embodiment, an image data generator is implemented by image input device 57 of mobile phone 50. An image data converter is implemented by communication image generator 85 of image conversion server 80. An image display is implemented by the image display of mobile phone 60. A sender is implemented by controller 81 of image conversion server 80 and network interface 84.

Modifications of the video communication system according to the third exemplary embodiment will be described below.

(Modification 1)

In the above description, image conversion server 80 sends illustration image data to mobile phone 60.

According to modification 1, image conversion server 80 changes the image data to be sent to mobile phone 60 from the illustration image data to the captured image data in response to a request from mobile phone 60. Alternatively, as illustrated in modification 3 of the first exemplary embodiment, image conversion server 80 may control parameters of the illustration-like image conversion to change the degree of the illustration-like expression of the illustration image data (the degree of the conversion performed by communication image generator 85) for thereby generating image data to be sent.

The arrangement of mobile phones 50, 60 and the arrangement of image conversion server 80 according to modification 1 are the same as those according to the third exemplary embodiment. However, central controller 81 of image conversion server 80 is also operable to change the image data to be sent or to change the degree of the conversion performed by communication image generator 82 (the degree of the illustration-like expression) in response to a request from mobile phone 60.

Operation of the video communication system according to modification 1 will be described below.

After the start of a communication session, mobile phone 50 sends captured image data to mobile phone 60.

Controller 81 of image conversion server 80 receives the captured image data. Communication image generator 85 converts the captured image data into illustration image data, and controller 81 sends the illustration image data to mobile phone 60.

Mobile phone 60 receives the illustration image data and displays an illustration-like image of the speaker.

The above operation is the same as the operation, described above, according to the third exemplary embodiment.

While in the communication session, the speaker using mobile phone 60 may want to see an image having a illustration-like expression changed from the illustration-like image set by the speaker using mobile phone 50 or may want to see the actual image of the speaker using mobile phone 50. In such a case, the speaker using mobile phone 60 inputs an instruction to send an image data changing request to image conversion server 80, through a key pad (not shown), in the communication session. When the instruction is input, mobile phone 60 sends a changing request to image conversion server 80. At this time, central controller 51 of mobile phone 60 controls wireless device 54 to send the changing request.

When controller 81 of image conversion server 80 receives the changing request from mobile phone 60, controller 81 stops the converting process performed by communication image generator 85. Controller 81 sends the captured image data received from mobile phone 50 to mobile phone 60. Alternatively, according to the changing request, controller 81 may control communication image generator 85 to change the degree of the illustration-like expression (the degree of the conversion) and convert the captured image data into illustration image data based on the changed degree, and may send the image data converted by communication image generator 85 to mobile phone 60.

When controller 81 receives the changing request, controller 81 send screen information for prompting the speaker to enter an input indicative of whether the image data to be sent may be changed according to the changing request or not. In such a case, mobile phone 50 displays such a screen, and when information for changing the image data is input, mobile phone 50 sends the information to image conversion server 80.

Only when controller 81 of image conversion server 80 receives the information, controller 81 changes the image data to be sent from the illustration image data to the captured image data. Alternatively, controller 81 changes the degree of the conversion from the captured image data into the illustration image data.

Mobile phone 60 receives the captured image data from image conversion server 80, and displays an image of the speaker using mobile phone 50 based on the received captured image data. As a result, the speaker using mobile phone 60 can see an image having the requested degree of the illustration-like expression or an image captured by mobile phone 50.

As described with respect to modification 3 of the first exemplary embodiment, when the captured image data are sent in response to the changing request from mobile phone 60, the amount of data sent increases, and the cost of communications also increases. The increase in the cost of communications or the entire cost of communications may be borne by the speaker using mobile phone 60. Image management server 80 may manage the communication fees for the respective speakers.

Figure 17:
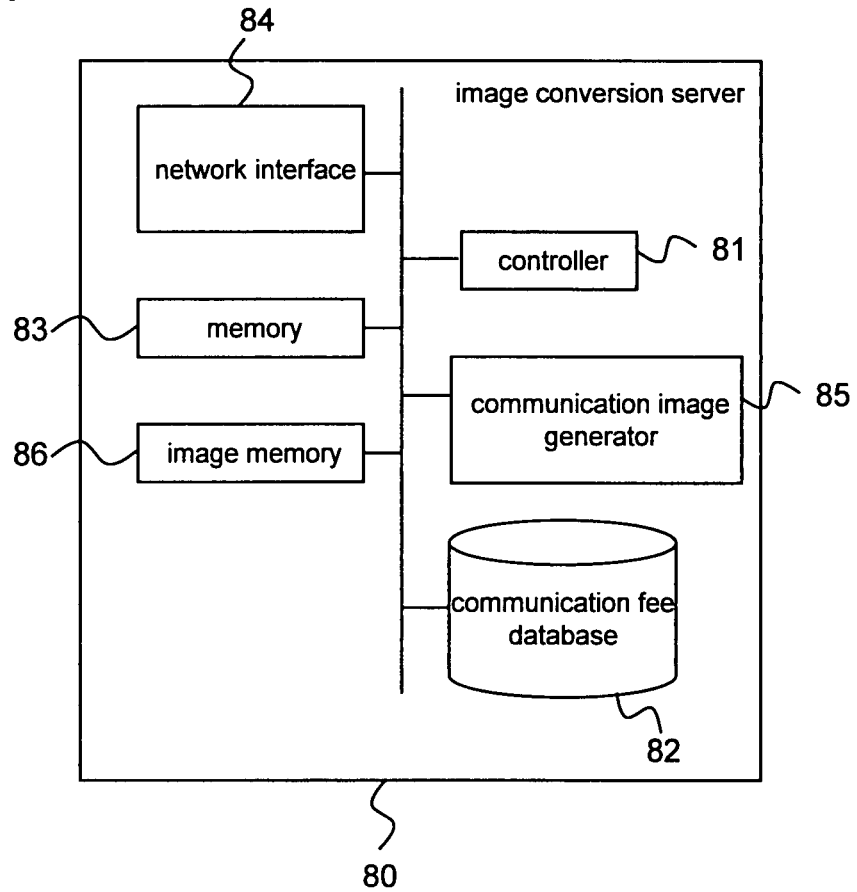
FIG. 17 is a block diagram showing an arrangement of an image conversion server according to modification 1 of the third exemplary embodiment of the present invention.

If image management server 80 manages the communication fees for the respective speakers, then image management server 80 is arranged as shown in FIG. 17.

FIG. 17 is a block diagram showing an arrangement of image conversion server 80 according to modification 1 of the third exemplary embodiment of the present invention.

As shown in FIG. 17, image conversion server 80 includes communication fee database 82. Other details of image conversion server 80 are identical to those shown in FIG. 16.

Communication fee database 82 stores communication fees to be billed respectively to the speakers using mobile phones 50, 60.

When a communication session starts between mobile phones 50, 60, controller 81 calculates a communication fee depending on the amount of image data sent to mobile phone 60 and the communication time. Controller 81 assigns the communication fee to the speaker who is to be charged, and stores information of the communication fee in communication fee database 82.

Controller 81 determines a communication fee incurred until a changing request is received as a fee to be billed to the speaker using mobile phone 50 who has requested the start of the communication session. Controller 81 determines a communication fee, either partly or entirely, incurred after a changing request is received as a fee to be billed to the speaker using mobile phone 60 who has sent the changing request, and determines any remaining communication fee as a fee to be billed to the speaker using mobile phone 50 who has requested the start of the communication session.

FIG. 18(*a*) is a diagram showing an example of communication fees when image conversion server 80 converts captured image data into illustration image data and when image conversion server 80 does not convert captured image data into illustration image data. The communication fees shown in FIG. 18 are communication fees per minute.

Regardless of whether image conversion server 80 performs the converting process, mobile phone 50 sends captured image data to mobile phone 60.

As shown in FIG. 18(*a*), the communication fee for sending the captured image data from mobile phone 50 to image conversion server 80 is 5 yen per minute.

When image conversion server 80 converts captured image data into illustration image data and sends the illustration image data to mobile phone 60, the communication fee for sending the illustration image data from image conversion server 80 to mobile phone 60 is 3 yen per minute. Therefore, when image conversion server 80 performs the converting process, the communication fee for sending the illustration image data from mobile phone 50 to mobile phone 60 is 8 yen per minute.

When image conversion server 80 does not convert captured image data into illustration image data and sends the captured image data, whose amount of data is greater, to mobile phone 60, the communication fee for sending the captured image data from image conversion server 80 to mobile phone 60 is 5 yen per minute. Therefore, when image conversion server 80 does not perform the converting process, the communication fee for sending the illustration image data from mobile phone 50 to mobile phone 60 is 10 yen per minute. When image conversion server 80 does not perform the converting process, the communication fee is higher by 2 yen (=10 yen−8 yen) per minute than when image conversion server 80 performs the converting process.

Controller 81 calculates a communication fee to charge the speaker using mobile phone 50 which sends image data with 8 yen per minute until controller 81 receives a changing request from mobile phone 60, and stores the communication fee to be billed to the speaker using mobile phone 50, in communication fee database 82. The speaker using mobile phone 60 which receives the image data does not bear the communication fee during this period.

FIG. 18(*b*) is a diagram showing an example of communication fees after mobile phone 60 has sent an image data changing request. Modes 1 through 3 shown in FIG. 18(*b*) represent communication fee sorting modes after controller 81 of image conversion server 80 has received the changing request.

Controller 81 calculates communication fees for the respective speakers according to either one of modes 1 through 3 shown in FIG. 18(*b*), and stores the communication fees in communication fee database 82. Alternatively, controller 81 may calculate communication fees according to other modes.

Mode 1 is a mode wherein the speaker using mobile phone 50 is requested to pay the same amount (8 yen per minute) as before the changing request is received, and the speaker using mobile phone 60 which has sent the changing request is requested to pay a communication fee (2 yen per minute) which has been added due to the changed image data.

Mode 2 is a mode wherein the speaker using mobile phone 60 which has sent the changing request is requested to pay the entire communication fee (10 yen per minute) after the changing request has been sent. The speaker using mobile phone 50 which sends the image data does not need to bear the communication fee after image conversion server 80 has started to send the captured image data in response to the changing request.

Mode 3 is a mode wherein the speaker using mobile phone 60 which has sent the changing request is requested to pay the entire communication fee (10 yen per minute) after the changing request has been sent and a fee (10 yen per minute) for viewing the captured image unchanged. Therefore, the speaker using mobile phone 60 is charged with 20 yen per minute. As shown in FIG. 18(*a*), the communication fee at the time the image conversion server 80 does not perform the converting process and sends the captured image data is 10 yen per minute. Controller 81 stores the difference of 10 yen per minute (=20 yen−10 yen) in communication fee database 82 such that it will be paid from the carrier to the speaker using mobile phone 50.

According to modification 1, a changing request sender is implemented by the central controller and the wireless device of mobile phone 60. A data-to-be-sent changer and a communication fee calculator are implemented by controller 81 of image conversion server 80.

According to modification 1, image conversion server 80 converts image data of an actually captured image of the speaker into illustration image data, and sends the illustration image data to mobile phone 60.

Therefore, good communications can be realized. As communication image generator 85 converts the entire image data to reduce the number of colors. Therefore, there is no need for a process for recognizing which area represents the face and extracting feature points, and the processing burden is reduced. Since the mobile phones do not convert image data, the processing burden of the mobile phones is reduced.

In the above description, mobile phone 50 sends image data, and mobile phone 60 receives the image data and displays an image. However, each of mobile phones 50, 60 may send image data to the other, and display an image of the other party. In such a case, each of mobile phones 50, 60 may be of an identical structure including image input device 57, and may be arranged to display an image based on the received image data.

In the first through third exemplary embodiments, mobile phones 50, 60 send and receive image data. However, a terminal for sending and receiving image data may be a terminal (e.g., a PDA or the like) other than mobile phones, or a terminal other than mobile terminals.

INDUSTRIAL APPLICABILITY

The present invention is applicable to a system for sending and receiving image data, such as a videophone system or the like.

The invention claimed is:

1. A video communication system comprising a first terminal for sending image data of an object to be imaged and a second terminal for receiving the image data sent from said first terminal,
said first terminal comprising image data converting means including:
first color converting means for converting components of the image data of the object to be imaged into luminance, saturation, and hue in a color space wherein saturation and hue do not change even if luminance changes or a color space wherein saturation and hue do not converge to one point when luminance has a maximum value;
filtering means for performing spatial filtering on said luminance;
emphasizing means for performing an emphasizing process to increase said saturation; and
second color converting means for converting the luminance on which said spatial filtering has been performed, the saturation on which said emphasizing process has been performed, and the hue into components of said image data; and
said second terminal comprising:
image display means for displaying an image based on the image data converted by said image data converting means.

2. The video communication system according to claim 1, wherein said first terminal further comprises:
image data generating means for capturing an image of the object to be imaged and generating the image data of the object to be imaged;
wherein said image data converting means converts the image data generated by said image data generating means.

3. The video communication system according to claim 2, wherein said second terminal further comprises:
changing request sending means for sending a changing request for changing said image data to said first terminal in response to an action of a speaker using said second terminal; and
said first terminal further comprises:
data-to-be-sent changing means, responsive to said changing request, for controlling the degree of the conversion by said image data converting means based on said changing request or stopping the conversion by said image data converting means, and sending the image data converted by said image data converting means or the image data generated by said image data generating means to said second terminal.

4. The video communication system according to claim 3, further comprising:
a fee management server for calculating communication fees to be billed to speakers using said first and second terminals, respectively, and receiving the changing request sent from said second terminal to said first terminal;
said fee management server comprising:
communication fee calculating means for calculating communication fees to be billed to the speakers using said first and second terminals after said changing request is received.

5. A video communication system comprising a first terminal for sending image data of an object to be imaged, an image converter for receiving the image data sent from said first terminal and converting said image data, and a second terminal for receiving the image data converted by said image converter,
said image converter comprising image data converting means including:
first color converting means for converting components of the image data of the object to be imaged into luminance, saturation, and hue in a color space wherein saturation and hue do not change even if luminance changes or a color space wherein saturation and hue do not converge to one point when luminance has a maximum value;
filtering means for performing spatial filtering on said luminance;
emphasizing means for performing an emphasizing process to increase said saturation; and
second color converting means for converting the luminance on which said spatial filtering has been performed, the saturation on which said emphasizing process has been performed, and the hue into components of said image data; and
said second terminal comprising:
image display means for displaying an image based on the image data converted by said image data converting means.

6. The video communication system according to claim 5, wherein said first terminal further comprises:
image data generating means for capturing an image of the object to be imaged and generating the image data of the object to be imaged;
wherein said image data converting means converts the image data generated by said image data generating means.

7. The video communication system according to claim 6, wherein said second terminal further comprises:
changing request sending means for sending a changing request for changing said image data to said first terminal in response to an action of a speaker using said second terminal; and said image converter further comprises:
data-to-be-sent changing means, responsive to said changing request, for controlling the degree of the conversion by said image data converting means based on said changing request or stopping the conversion by said image data converting means, and sending the image data converted by said image data converting means or the image data generated by said image data generating means to said second terminal.

8. The video communication system according to claim 7, wherein said image converter further comprises:
communication fee calculating means for calculating communication fees to be billed to the speakers using said first and second terminals after said changing request is received.

9. A terminal for sending image data to another terminal, comprising:
image data converting means including:
first color converting means for converting components of the image data of the object to be imaged into luminance, saturation, and hue in a color space wherein saturation and hue do not change even if luminance changes or a color space wherein saturation and hue do not converge to one point when luminance has a maximum value;
filtering means for performing spatial filtering on said luminance;
emphasizing means for performing an emphasizing process to increase said saturation; and
second color converting means for converting the luminance on which said spatial filtering has been performed, the saturation on which said emphasizing process has been performed, and the hue into components of said image data.

10. The terminal according to claim 9, further comprising:
image data generating means for capturing an image of the object to be imaged and generating the image data of the object to be imaged;
wherein said image data converting means converts the image data generated by said image data generating means.

11. A terminal for receiving image data generated by imaging an object to be imaged from another terminal, comprising:
image data converting means including:
first color converting means for converting components of the image data of the object to be imaged into luminance, saturation, and hue in a color space wherein saturation and hue do not change even if luminance changes or a color space wherein saturation and hue do not converge to one point when luminance has a maximum value;
filtering means for performing spatial filtering on said luminance;
emphasizing means for performing an emphasizing process to increase said saturation; and
second color converting means for converting the luminance on which said spatial filtering has been performed, the saturation on which said emphasizing process has been performed, and the hue into components of said image data; and
image display means for displaying an image based on the image data converted by said image data converting means.

12. An image converter for receiving image data generated by imaging an object to be imaged from a first terminal, converting said image data, and sending the converted image data to a second terminal, comprising:
image data converting means including:
first color converting means for converting components of the image data of the object to be imaged into luminance, saturation, and hue in a color space wherein saturation and hue do not change even if luminance changes or a color space wherein saturation and hue do not converge to one point when luminance has a maximum value;
filtering means for performing spatial filtering on said luminance;
emphasizing means for performing an emphasizing process to increase said saturation; and
second color converting means for converting the luminance on which said spatial filtering has been performed, the saturation on which said emphasizing process has been performed, and the hue into components of said image data; and
sending means for sending the image data converted by said image data converting means to said second terminal.

13. The image converter according to claim 12, further comprising:
data-to-be-sent changing means, responsive to a changing request for changing said image data from said second terminal, for controlling the degree of the conversion by said image data converting means based on said changing request or stopping the conversion by said image data converting means, and sending the image data converted by said image data converting means or the image data generated by imaging the object to be imaged to said second terminal.

14. The image converter according to claim 13, further comprising:
communication fee calculating means for calculating communication fees to be billed to the speakers using said first and second terminals after said changing request is received.

* * * * *